United States Patent
Kish et al.

(10) Patent No.: US 10,412,905 B2
(45) Date of Patent: Sep. 17, 2019

(54) EXPANDABLE PLANT COVER

(71) Applicant: NuVue Products Ltd., Toronto (CA)

(72) Inventors: Edward James Kish, Toronto (CA);
Douglas K. Ward, Toronto (CA);
Mirek Kacprzak, Ontario (CA); Ken Miller, Ontario (CA)

(73) Assignee: NuVue Products Ltd., Toronto (CA)

( * ) Notice: Subject to any disclaimer, the term of this patent is extended or adjusted under 35 U.S.C. 154(b) by 200 days.

(21) Appl. No.: 15/582,208

(22) Filed: Apr. 28, 2017

(65) Prior Publication Data

US 2017/0311557 A1 Nov. 2, 2017

Related U.S. Application Data

(60) Provisional application No. 62/329,261, filed on Apr. 29, 2016.

(51) Int. Cl.
*A01G 13/04* (2006.01)
*A01G 13/10* (2006.01)

(52) U.S. Cl.
CPC ........... *A01G 13/043* (2013.01); *A01G 13/10* (2013.01)

(58) Field of Classification Search
CPC ............... A01G 13/043; A01G 13/04; A01G 2013/046; A01G 13/02; A01G 13/00; E04H 15/28
See application file for complete search history.

(56) References Cited

U.S. PATENT DOCUMENTS

| | | | |
|---|---|---|---|
| D33,787 S | 12/1900 | Meiners | |
| 1,112,052 A | 9/1914 | Campbell | |
| 1,600,749 A | 9/1926 | Barnes | |
| D77,232 S | 12/1928 | Graffenberger | |
| 1,814,339 A | 7/1931 | Sato | |
| 1,978,921 A | 10/1934 | Wade | |
| 2,141,484 A | 12/1938 | Piglia | |
| D161,231 S | 12/1950 | Alvarez | |
| 3,214,865 A | 11/1965 | Rosenvold et al. | |
| 4,966,178 A * | 10/1990 | Eichhorn | E04H 15/28 135/123 |
| 5,328,286 A * | 7/1994 | Lee | E04H 15/48 135/135 |
| 5,456,043 A | 10/1995 | Dacon, Sr. | |
| 5,509,229 A | 4/1996 | Thomasson et al. | |

(Continued)

*Primary Examiner* — Kristen C Hayes
(74) *Attorney, Agent, or Firm* — Tavolli, Sundheim, Covell & Tummino LLP

(57) ABSTRACT

A plant cover transformable between collapsed and expanded states and including: a frame including a plurality of rods; a foldable canopy secured to the rods; and a pivoting support assembly operatively coupled to the frame. The pivoting support assembly includes: a brace having a central base and a plurality of projections extending radially outwardly from the central base and defining a longitudinally extending socket, a pivot support defining a pivot axis, and a latch receiver; and a plurality of rod supports pivotally coupled to a respective projection of the plurality of projections of the brace. Each rod support including a split hearing collar at one end pivotally mounted to the pivot support of a corresponding projection and a latch member at the opposite end, the latch member engaging the latch receiver to secure the corresponding rod support in the open position.

20 Claims, 32 Drawing Sheets

(56) References Cited

U.S. PATENT DOCUMENTS

| | | | |
|---|---|---|---|
| 5,605,008 | A | 2/1997 | Johnston et al. |
| 5,613,320 | A | 3/1997 | Thomasson et al. |
| D399,713 | S | 10/1998 | Allen et al. |
| D408,233 | S | 4/1999 | Price |
| 6,233,868 | B1 | 5/2001 | Hahn et al. |
| 7,185,666 | B2 | 3/2007 | Chai |
| 7,497,048 | B2 | 3/2009 | Bakowski |
| D653,919 | S | 2/2012 | Ward et al. |
| 9,896,862 | B1 * | 2/2018 | Cox ................... E04H 15/28 |
| 2005/0224107 | A1 * | 10/2005 | Yang ................... E04H 15/48 135/135 |

* cited by examiner

EXPANDABLE PLANT COVER

CROSS REFERENCE TO RELATED APPLICATION

The following application claims priority under 35 U.S.C. § 119(e) to U.S. Provisional Patent Application Ser. No. 62/329,261, filed Apr. 29, 2016 entitled EXPANDABLE PLANT COVER. The above-identified application is incorporated herein by reference in its entirety for any and all purposes.

TECHNICAL FIELD

The present disclosure relates to a plant or shrub cover and, more specifically, to an expandable plant cover including an actuation assembly operable to selectively transform the plant cover between a collapsed state wherein the plant cover is folded into a cylindrical configuration and an expanded state herein the plant cover opens outwardly forming a canopy or cover for overlying and/or enclosing and thereby protecting plants, vegetation and the like from weather, the elements, and/or birds and insects and/or provide a favorable growing environment for healthy plant growth.

BACKGROUND

Plant covers, often times called shrub or vegetation covers, are used for protection of vegetation such as plants, shrubs, flowers, bushes, plant seedlings, such as vegetable and flower seedlings, and the like (hereinafter generally referred to as "plants") from extreme weather conditions, typically cold, frost, or freezing temperatures or elements such as sun, hail, snow, wind, etc., that would otherwise damage or kill the vegetation. Plant covers may also function as a physical barrier providing protection of plants from pests, such as, flying and crawling insects, rodents, and other animals and/or protect the fruit of fruit-bearing bushes from birds. When installed, a plant cover will overlie and/or enclose vegetation or a portion of the vegetation, thereby providing a degree of protection for the vegetation or the covered portion of the vegetation from the weather conditions and/or elements and/or pests. An example of such a plant or shrub cover is U.S. Design Pat. No. D653,919 to Ward et al., assigned to the assignee of the present disclosure.

SUMMARY

In one aspect, the present disclosure relates to a plant cover extending along a central axis and selectively transformable between a collapsed state and an expanded state, the plant cover comprising: a) a frame including a plurality of rods, each of the plurality of rods including a first end and a second end, in the expanded state of the plant cover, a second end of each rod of the plurality of rods being a greater radial distance from the central axis of the plant cover than in the collapsed state of the plant cover; b) a foldable canopy secured to the plurality of flexible rods; and c) a pivoting support assembly operatively coupled to the frame, the pivoting support assembly including: i) a brace having a central base and a plurality of projections circumferentially spaced apart and extending radially outwardly from the central base, each projection of the plurality of projections extending along a radial projection axis and including an upper wall and first and second spaced apart side walls extending from the upper wall, a proximal end adjacent the central base and a distal end radially spaced from the proximal end, the upper wall and the first and second side walls defining a longitudinally extending socket extending along the radial projection axis of the projection, a pivot support defining a pivot axis, and a latch receiver; and ii) a plurality of rod supports, each rod support of the plurality of rod supports pivotally coupled to a respective corresponding projection of the plurality of projections of the brace and including a proximal portion and a distal portion spaced apart by a body portion extending longitudinally along a rod support longitudinal axis and including an opening receiving a first end of a respective corresponding flexible rod of the plurality of flexible rods, the proximal portion of the rod support including a collar pivotally mounted to the pivot support of the respective corresponding projection of the plurality of projections and the distal portion of the rod support including a latch, the rod support pivoting between an open position and a closed position, in the open position, the body portion being received in the socket of the respective corresponding projection and the latch engaging the latch receiver of the respective corresponding projection and, in the closed position, the latch disengaged from the latch receiver of the respective corresponding projection and the body extending transverse to the radial projection axis of the respective corresponding projection.

In another aspect, the present disclosure relates to a pivot support assembly for selectively transforming a plant cover extending along a central axis between a collapsed state and an expanded state, the plant cover including a frame including a plurality of rods, each of the plurality of rods including a first end and a second end, in the expanded state of the plant cover, a second end of each rod of the plurality of rods being a greater radial distance from the central axis of the plant cover than in the collapsed state of the plant cover and a foldable canopy secured to the plurality of flexible rods, the pivoting support assembly operatively coupled to the frame, the pivoting support assembly comprising: a) a brace having a central base and a plurality of projections circumferentially spaced apart and extending radially outwardly from the central base, each projection of the plurality of projections extending along a radial projection axis and including an upper wall and first and second spaced apart side walls extending from the upper wall, a proximal end adjacent the central base and a distal end radially spaced from the proximal end, the upper wall and the first and second side walls defining a longitudinally extending socket extending along the radial projection axis of the projection, a pivot support defining a pivot axis for the projection, and a latch receiver; and b) a plurality of rod supports, each rod support of the plurality of rod supports pivotally coupled to a respective corresponding projection of the plurality of projections of the brace and including a proximal portion and a distal portion spaced apart by a body portion extending longitudinally along a rod support longitudinal axis and including an opening configured to receive a first end of a respective corresponding flexible rod of the plurality of flexible rods, the proximal portion of the rod support including a collar pivotally mounted to the pivot support of the respective corresponding projection of the plurality of projections and the distal portion of the rod support including a latch, the rod support pivoting between an open position and a closed position, in the open position, the body portion being received in the socket of the respective corresponding projection and the latch engaging the latch receiver of the respective corresponding projection and, in the closed position, the latch disengaged from the latch receiver of the respective corresponding projection and the body extending transverse to the radial projection axis of the respective corresponding projection.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

DETAILED DESCRIPTION

Figure 1:
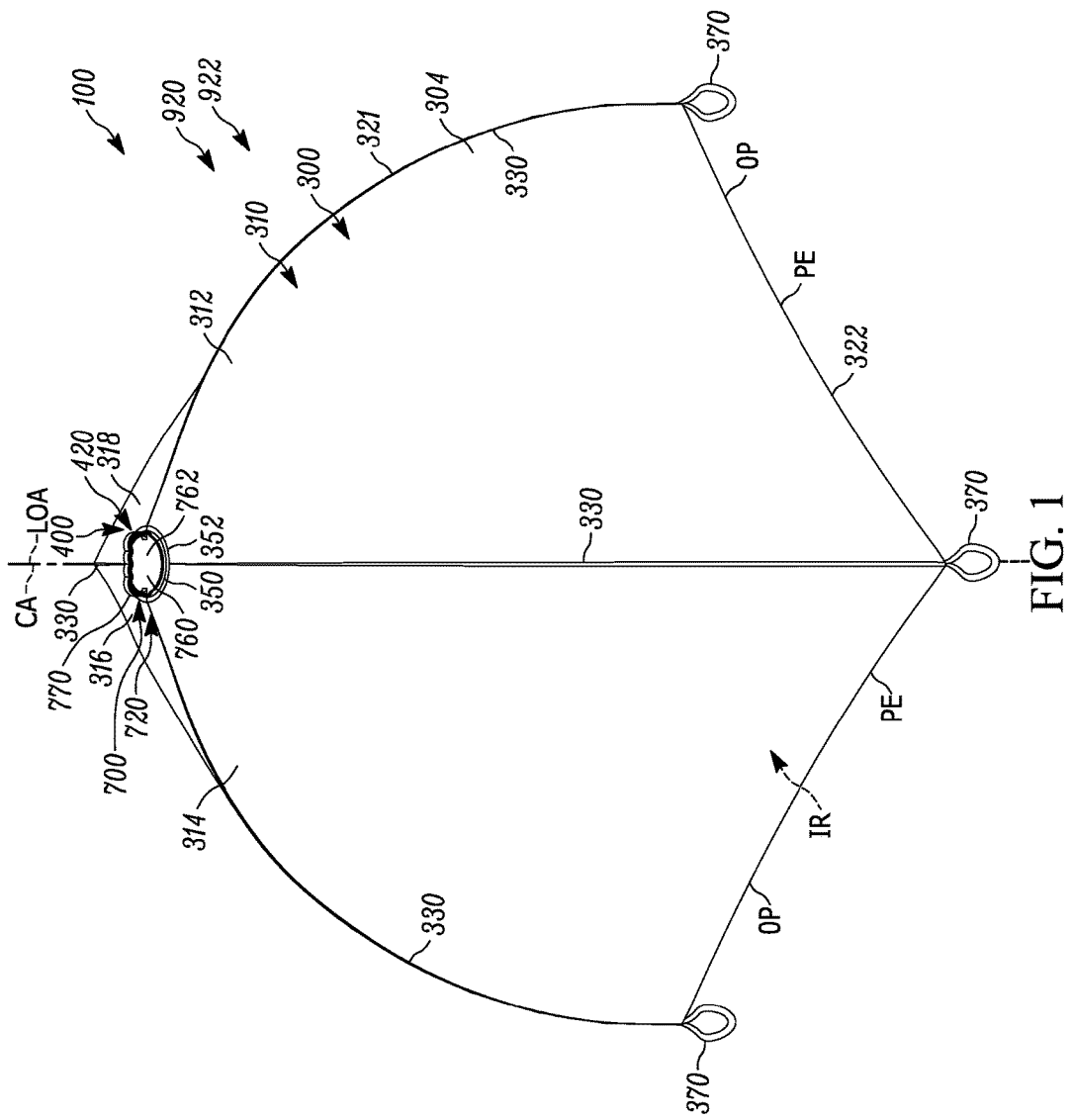
FIG. 1 is a schematic perspective view of a first exemplary embodiment of a plant cover of the present disclosure in an expanded state.

The present disclosure relates to a plant or shrub or vegetation cover that advantageously provides an actuation assembly for selectively transforming the plant cover between an expanded state, wherein the plant cover is expanded for use as a covering protection for plants, shrubs, vegetation and the like, and a collapsed state wherein the plant cover is contracted into a compact, generally cylindrical configuration. In the collapsed state, the compact cylindrical configuration of the plant cover advantageously minimizes the space or footprint occupied by the plant cover. This compact cylindrical configuration in the collapsed state of the plant cover of the present disclosure is advantageous at a number of levels including shipment of the plant cover along the distribution chain from manufacturer to retailer, competing for shelf space at the retail store, and storage of the plant cover after purchase.

The plant cover of the present disclosure is shipped, offered for sale and stored in the collapsed state. Prior to purchase, the compact cylindrical configuration of the plant cover of the present disclosure is easier and less costly to ship as compared to, for example, a plant cover having a planar collapsed configuration. A planar collapsed configuration of a plant cover shown, for example, in FIG. 8 of U.S. Design Pat. No. D653,919, previously discussed. Thus, as the plant cover of the present disclosure moves along the product distribution channel, transportation costs are reduced. To the extent that the plant cover is stored in a warehouse along the distribution channel, the compact configuration of the plant cover of the present disclosure reduces warehousing costs as more units can be stored in a given storage area or storage rack space.

At a retail store, retail shelf space is limited and, therefore, valuable to the retailer. Many potential products compete for a retailer's existing shelf space. All other things being equal, retailers will favor a product with a more compact storage configuration as such compact configuration products generally take up less shelf space, thereby allowing the retailer to offer more products in total for given amount of shelf space. When introducing a new product, a retailer is uncertain if the product will be a sales success, thus, retailers will generally want to offer as many products as possible in a given amount of shelf space thereby hopefully maximizing total sales volume. The compact cylindrical configuration of the plant cover of the present disclosure in its collapsed or storage state minimizes or reduces the shelf space taken up by the plant cover in storage, as compared to, for example the planar collapsed configuration of the '919 patent. Thus, all other things being equal, retailers are more likely to stock the plant cover of the present disclosure. A performance measure that a retailer often uses is to calculate the return/profit generated per linear or per square foot in a store/plan-o-gram. A product or unit that occupies less space, has higher unit sales and delivers more profit per space calculation is preferred by a retailer. Effectively, if a supplier can provide multiple products that can be merchandised in a smaller footprint within a store and deliver more unit sales, such product have an improved chance of being selected and sold by the retailer. The plant cover of the present disclosure advantageously provides such a smaller footprint and can be offered as multiple products of differing sizes (i.e., offering a small size plant cover for a small plant or flower and offering a larger size plant cover for a larger rose bush) and differing canopy covering or fabric materials (i.e., offering a plant cover with a thicker, insulating canopy material to protect against freezing and offering a plant cover with a mesh material canopy to protect against pest and birds while allowing transmission of rain and sunlight).

Finally, once purchased, the compact cylindrical configuration of the plant cover of the present disclosure in the collapsed state is advantageous to the owner in terms of storage space required. During the off or non-growing season, less space is occupied when the plant cover is stored in the owner's garage, basement, storage shed, etc., which is an obvious advantage to the owner, especially given that the owner may utilize multiple plant covers for protection of a variety of plants, thus, may have to store 10-20 or more plant covers during the off or non-growing season. Further, the compact cylindrical configuration of the plant cover of the present disclosure means that a smaller total surface area is exposed to damage during storage and, therefore, the plant cover is less prone to damage from other gardening tools and items that may be stored in proximity to the plant cover, e.g., garden shovels, spades, forks, buckets, wheelbarrows, tomato cages, metal stakes, etc. Such gardening tool or items may fall on or be pushed against the plant cover. The compact cylindrical configuration both reduces the overall surface area of the plant cover exposed to such damage and the cylindrical configuration wherein the cover or fabric of the plant cover is folded along a central axis makes the cover or fabric less prone to being punctured or ripped than if the cover or fabric were in a planar configuration.

First Exemplary Embodiment—Plant Cover 100

Figure 2:
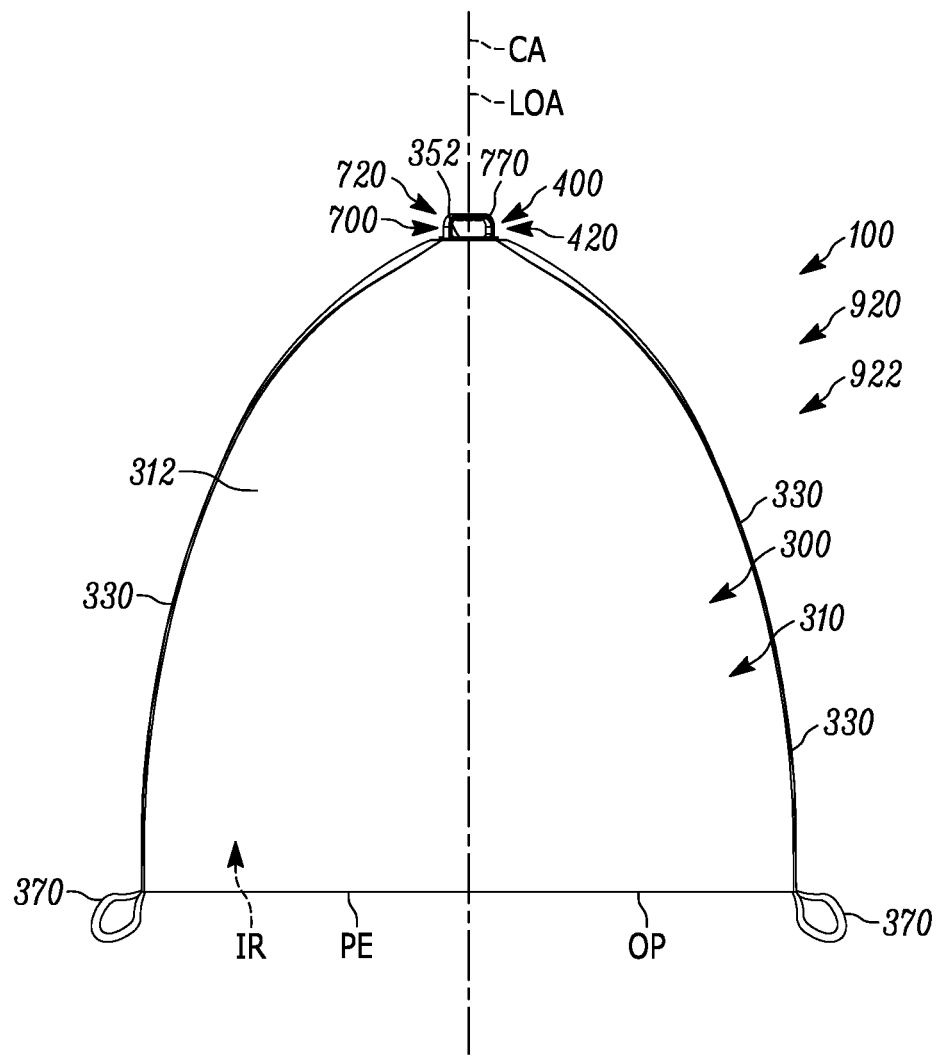
FIG. 2 is a schematic side elevation view of the plant cover of FIG. 1 in the expanded state.
Figure 3:
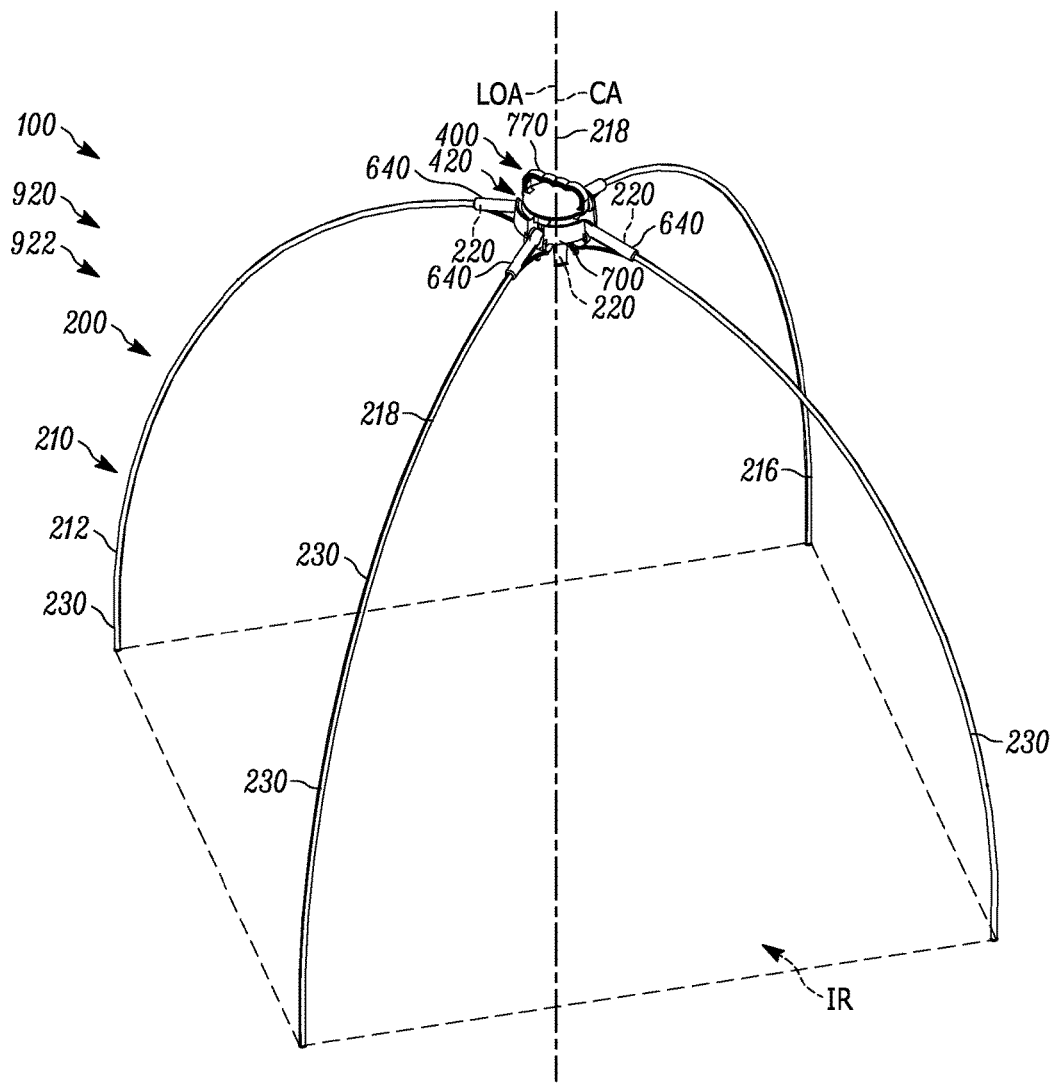
FIG. 3 is a schematic perspective view of the plant cover of FIG. 1 in the expanded state, with the foldable canopy removed for clarity.
Figure 4:
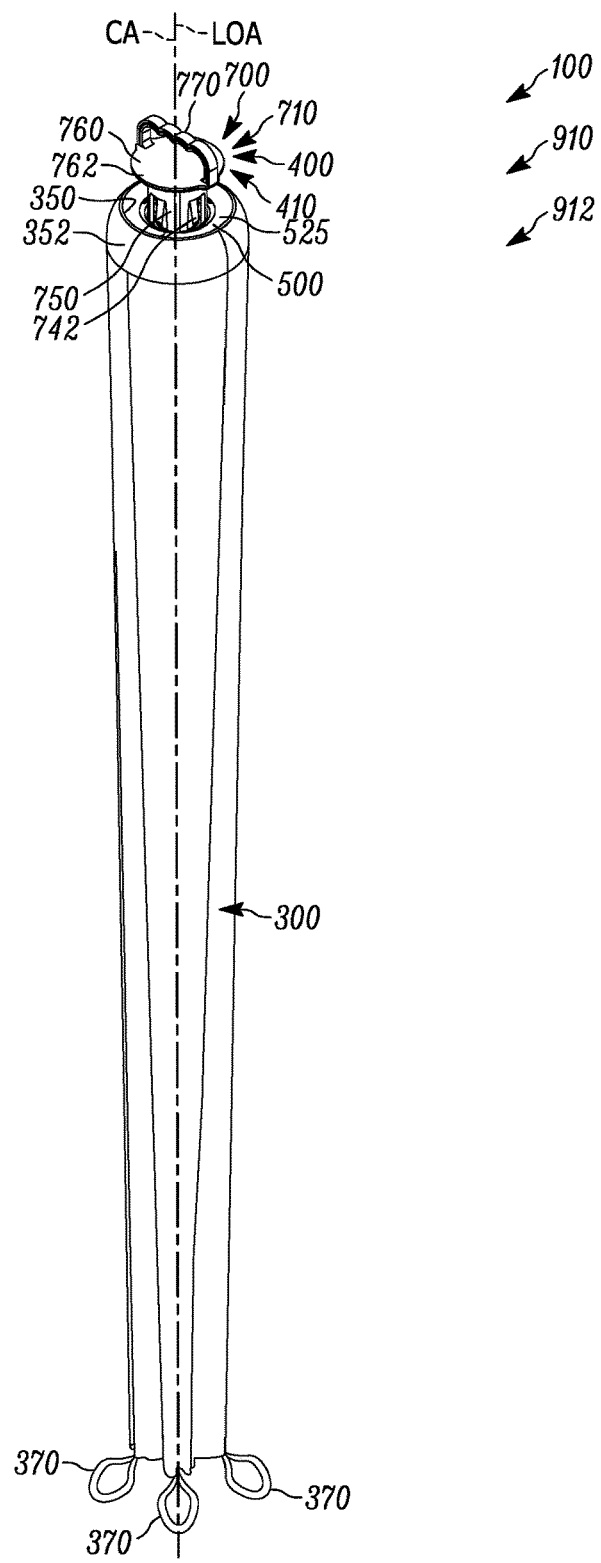
FIG. 4 is a schematic perspective view of the plant cover of FIG. 1 in a collapsed state.

Turning to the drawings, FIGS. 1-11 schematically depict a first exemplary embodiment of a plant cover of the present disclosure, generally at 100. FIGS. 1-3 schematically depict the plant cover 100 in the expanded or open state 920, while FIG. 4 schematically depicts the plant cover 100 in the collapsed or folded state 910. In the expanded state 920, the plant cover 100 is opened in an open umbrella-type configuration 922, such that the cover 100 may be suitably positioned to axially overlie and thereby protect vegetation, such as plants, shrubs and the like disposed within an outer perimeter OP of the cover 100, that is, disposed within an interior region IR defined by the cover 100. In the collapsed state 910, the plant cover 100 is retracted or folded into a closed umbrella-type or cylindrical configuration 912. The cylindrical configuration 912 is centered about and extends along a central longitudinal axis CA of the cover 100 and in the collapsed state 910, the volume interior region IR of the plant cover 100 is negligible, that is, substantially zero or close to zero.

The plant cover 100 includes a foldable canopy or canopy 300 affixed to and supported by a collapsible or pivoting frame 200 and an actuation assembly 400. The canopy includes an exterior surface 304 and an interior or inner surface 302. The canopy 300 and specifically the inner surface 302 of the canopy 300 define the interior region IR of the plant cover 100. The pivoting frame 200 comprises a plurality of rods 201 and is operatively connected to the actuation assembly 400. Specifically, respective first end portions 220 of the each of the plurality of rods are received in respective sleeves 640 of a plurality of pivoting rod supports 610 of a rods support assembly 600 of the actuation assembly 400. Movement of the actuation assembly 400 between a closed position 410 to an open position 420 moves or pivots the frame 200 radially outwardly away from central longitudinal axis CA such that the plant cover 100 transforms or moves from the collapsed state 910 (when the actuation assembly 400 is in the closed position 410) to the expanded state 920 (when the actuation assembly 400 is in the open position 420). The actuation assembly 400 is centered about and extends along the cover central axis CA and an actuator 700 extends through a central opening 350 of the canopy 300 so that the actuation assembly 400 advantageously may be actuated by a user of the plant cover 100 standing above and being completely outside of the interior region IR of the plant cover 100 to move the cover 100 from the collapsed state 910 to the expanded state 920 and vice versa. Stated another way, the user can move the actuation assembly 400 from the closed position 410 to the open position 420 to move the plant cover 100 from the collapsed state 910 to the expanded state 920 and vice versa without reaching into, the interior region IR of the plant cover 100. The actuator 700 is centered about the plant cover central axis CA and moves or slides axially along the central axis CA within a throughbore 550 defined by an annular base 500 of the actuation assembly 400.

Canopy 300

The canopy 300, in one exemplary embodiment, is a weather resistant, foldable material such as synthetic polyethylene weave material, similar in nature to a lightweight tamp. However, it should be recognized that the material/fabric for the canopy 300 will vary depending on the function or functions of the plant cover 100, the elements or weather conditions or pests (birds, flying or crawling bugs, etc.) being protected against, the degree to which it is desired that the canopy 300 allow for the transmission of sunlight, wind and/or rain through the canopy, and/or the nature of the vegetation being protected. That is, if the primary function of the plant cover 100 is cold weather protection of vegetation, a denser tarp-like polyethylene weave material may be appropriate. If the primary function of the cover 100 is protection of a fruit bearing plant against birds (e.g., protecting blueberries of a blueberry bush from birds), the material may advantageously be a porous, netting-type material, that allows sunlight, wind and rain to pass through the material but deters birds from pecking the blueberries. If the plant cover 100 is used for protection of the covered plant(s) against insects, a light netting material may be sufficient. For protection against birds or rodents, a heavier netting material may be more suitable. Heavy woven materials or fabrics may be appropriate for severe weather and snow load protection. Non-woven materials may be used for overnight frost protection. Clear plastic sheeting may be a suitable material for the plant cover 100 if it is desired to induce a greenhouse effect in the interior region IR of the plant cover 100. Thus, one of skill in the art will understand that the canopy 300 may be fabricated of a wide variety of materials, including but not limited to synthetic materials, clear and opaque plastics, synthetic and natural cloths and weaves, etc. and/or comprise multiple layers of materials and/or materials and coatings or any combination of the foregoing. The use of the terms material and/or fabric regarding the canopy 300 shall be understood to mean any suitable material or combination of materials, as explained above.

As can best be seen in FIGS. 1, 2 and 4, in one exemplary embodiment, the canopy 300 is comprised of a plurality of flexible, foldable pieces 310. In one exemplary embodiment, there are four generally triangular shaped canopy pieces 312, 314, 316, 318 each having opposite sides 320, a lower edge 322, and an upper region 324. The sides 320 of adjacent canopy pieces 310 are affixed together to form a longitudinally extending seam or interface segment 330 binding the adjacent canopy pieces 310 together to form the overall canopy 300. The upper regions 324 of the canopy pieces 310 define a central opening of the canopy 300. The lower edge 322 of the canopy pieces 310 define a lower or outer peripheral edge PE of the canopy 300. The lower peripheral edge PE of the canopy 300 defines the outer perimeter OP of the plant cover 100, when the plant cover 100 is in the expanded state 920. Additionally, located at equidistant spacing about the lower peripheral edge PE of the canopy 300 are four pockets 360 which receive respective second ends 230 of the plurality of rods 210. The pockets 360 may be sewn or otherwise affixed to the canopy 300.

In one exemplary embodiment, the rods of the plurality of rods 210 extend along the respective seams 330 of the canopy pieces 310 and are secured or affixed to the canopy 300 along the seams 330 by any suitable fastening method, e.g., tie strings or sleeves extending from the inner surface 302 of the canopy 300 such that the canopy 300 moves with the movement of the plurality of rods 210, the rods 210, in turn, being moved by the actuation assembly 400. Along the lower peripheral edge PE of the canopy 300, a plurality of loops 370 are provided for securing the plant cover 100 to the ground so that the plant cover 100 does not blow away or become dislodged due to wind. Stakes (not shown) are driven into the ground through the loops in conventional fashion to secure the plant cover 100 in position. Typically, a loop 370 is provided along the lower peripheral edge PE at each of the four seams 330 of the canopy 300 for securement purposes. However, it should be understood that additional loops 370 along the peripheral edge PE may be provided depending on the size of the plant cover 100 and the expected environmental conditions (e.g., wind) that the plant cover 100 will be subjected to and/or the performance/service requirements of the plant cover 100.

The loops 370 may be attached by sewing or other attachment method and may advantageously be sandwiched between a respective pocket 360 and the respective seam 330 to provide an enlarged region for secure sewing of both the pocket 360 and the aligned loop 370 along the seam material region. An upper portion 352 of the canopy 300 defines the central opening 350. The upper portion 352 of the canopy 300 overlies the annular base 500 of the actuation assembly 400 and a lower body 730 of the actuator 700 extends through the central opening 350 of the canopy 300.

Pivoting Frame 200

The pivoting frame 200, best seen in FIG. 3, is comprised of a plurality of rods 210 that function to: a) when moving from the expanded state 920 to the collapsed state 910 of the plant cover 100, pull or urge the canopy 300 and, specifically, pull or urge the slower peripheral edge PE of the canopy 300, radially inwardly toward the plant cover central axis CA thereby achieving the folded, compact, cylindrical configuration 912 of the plant cover 100 in the collapsed state 910; and b) when moving from the collapsed state 910 to the expanded state 920 of the plant cover 100, push or urge the canopy 300 and, specifically, pull or urge the lower peripheral edge PE of the canopy 300, radially outwardly away from the plant cover central axis CA thereby achieving the open umbrella-shaped configuration 912 of the plant cover 100 in the expanded state 920.

In one exemplary embodiment of the plant cover the frame 200 comprises four rods 212, 214, 216, 218, although the number of rods could be more or less than four, depending on the function and size of the plant cover 100. Similarly, a length or extent of each of the plurality of rods 210 will depend on the function of the plant cover, the size of the vegetation to be protected, etc. The greater the length of the plurality of rods 210, the larger the size of canopy 300 required and the larger the size or volume of the interior region IR of the plant cover 100 when in the expanded state 920. Each of the rods of the plurality of rods 210 includes the first end portion 220 which is received in a respective sleeve 640 of a plurality of pivoting rod supports 610 of a rod support assembly 600 of the actuation assembly 400 and the second end portion 230 which is received in a respective pocket 360 of the canopy 300. The number of rods of the plurality of rods 210 necessarily matches the number of rod supports of the plurality of rod supports 610 of the rod support assembly 600. Each of the four rods supports of the plurality of rod supports 610 of the rod support assembly 600 defines a pivot axis PA1, PA2, PA3, PA4. Thus, for a given rod support, for example, rod support 612, the associate rod 212 pivots about the pivot axis PA1. The first end portion 220 of the rod 212 is received in the sleeve 640 of the rod support 612, thus, the first end portion 220 is in close proximity to the pivot axis PA1. As the actuation assembly 400 is moved from a closed position 410 (corresponding to the collapsed state 910 of the plant cover 100) to an open position 420 (corresponding to the expanded state 920 of the plant cover 100), the rod 212 moves radially away from the central axis CA of the plant cover 100. However, because the rod 212 pivots about the pivot axis PA1, the second end portion 230 of the rod 212 (and the peripheral edge PE of the canopy 300) moves a much greater distance away from the central axis CA than the first end portion 220 of the rod 212 moves away from the central axis CA. By contrast, as the actuation assembly 400 is moved from the open position 420 to the closed position 420, the rod 212 moves radially toward the central axis CA of the plant cover 100. Again, because the rod 212 pivots about the pivot axis PA1, the second end portion 230 of the rod 212 (and the peripheral edge PE of the canopy 300) moves a much greater distance toward the central axis CA than the first end portion 220 of the rod 212 moves toward from the central axis CA. With four rods 212, 214, 216, 218 of the plurality of rods 210, in the expanded state 920, viewed from above, the lower peripheral edge PE of the plant cover 100 has a square configuration. If three rods were used, the plant cover would have a triangular configuration when viewed from above in the expanded state. If five rods were used, the plant cover would have a pentagon configuration when viewed from above, etc., as would be understood by one of skill in the art.

Actuation Assembly 400

In one exemplary embodiment, the actuation assembly 400, which is best seen in FIGS. 5-10, includes the stationary annular or cylindrical base 500 defining a central throughbore 550 centered about and extending along the plant cover central axis CA. The actuation assembly 400 further includes the actuator 700 received in the throughbore 550 of the cylindrical base 500 and movable axially along the plant cover central longitudinal axis CA between an upper or closed position 710, which corresponds to and defines the closed position 410 of the actuation assembly 400 (best seen in FIGS. 5, 9 and 10) and a collapsed state 910 of the plant cover 100, and a lower or open position 720, which corresponds to and defines the open position 410 of the actuation assembly (best seen in FIGS. 6-8) and an expanded state 920 of the plant cover 100. In one exemplary embodiment, the actuator 700 is an axially movable plunger. The actuator or plunger 700 includes an upper cover 760 and the lower body 730. The lower body 730 extends into and slides along the throughbore 550 of the base 500 for movement along the plant cover central axis CA. The upper cover 760 of the actuator 700 includes a handle 770 which is grasped by a user to move the actuator 700 between the upper or closed position 710 and the lower or open position 720. The actuation assembly 400 also includes the rod support assembly 600 comprising the plurality of pivoting rod supports 610. The plurality of rod supports 610 are supported by corresponding sockets of a plurality of sockets 530 of the annular base 500.

Annular Base 500

Figure 5:
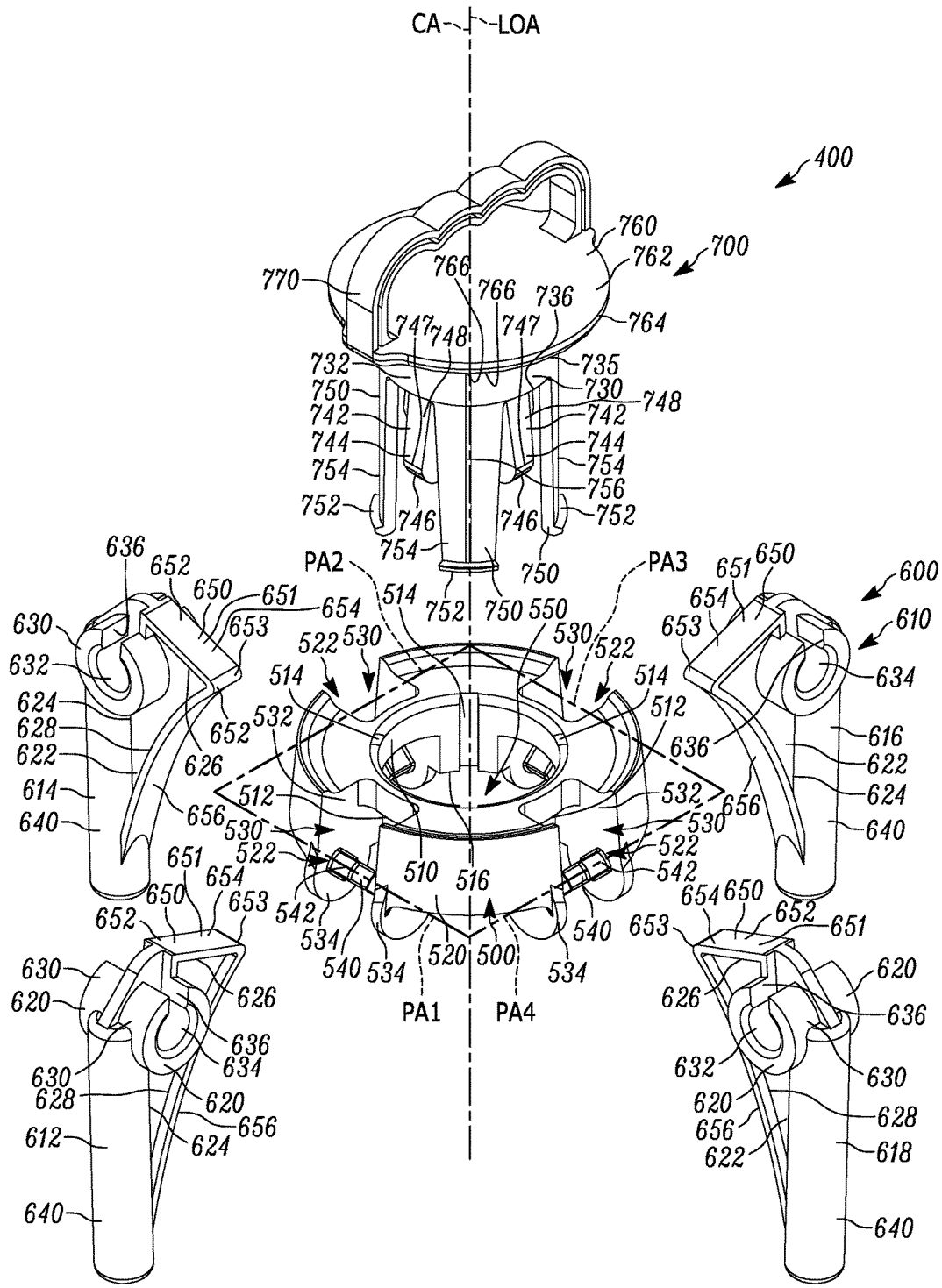
FIG. 5 is a schematic exploded perspective view of an actuation assembly of the plant cover of 1.
Figure 6:
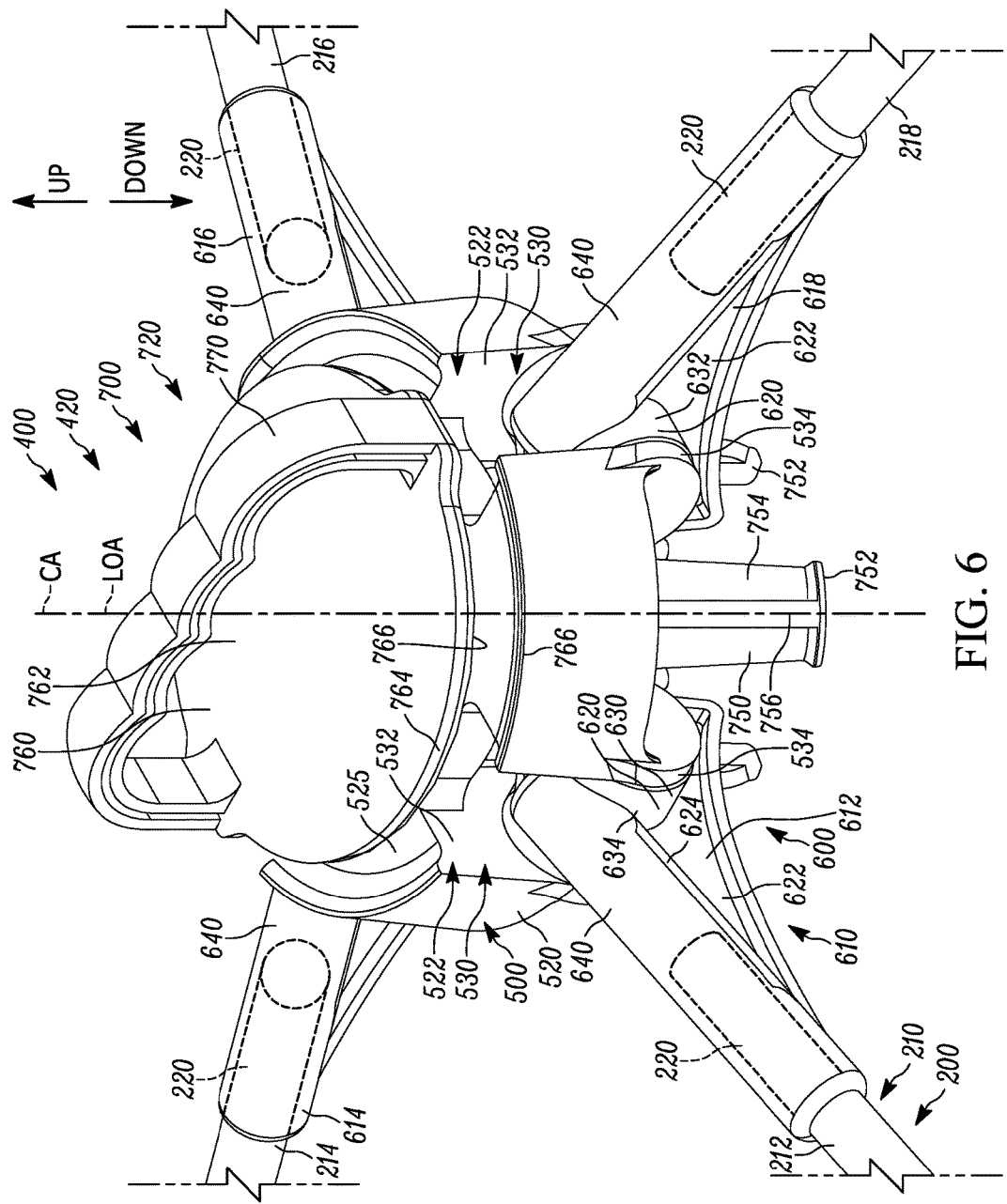
FIG. 6 is a schematic perspective view of the actuation assembly of FIG. 5 with the actuation assembly in an open position.
Figure 7:
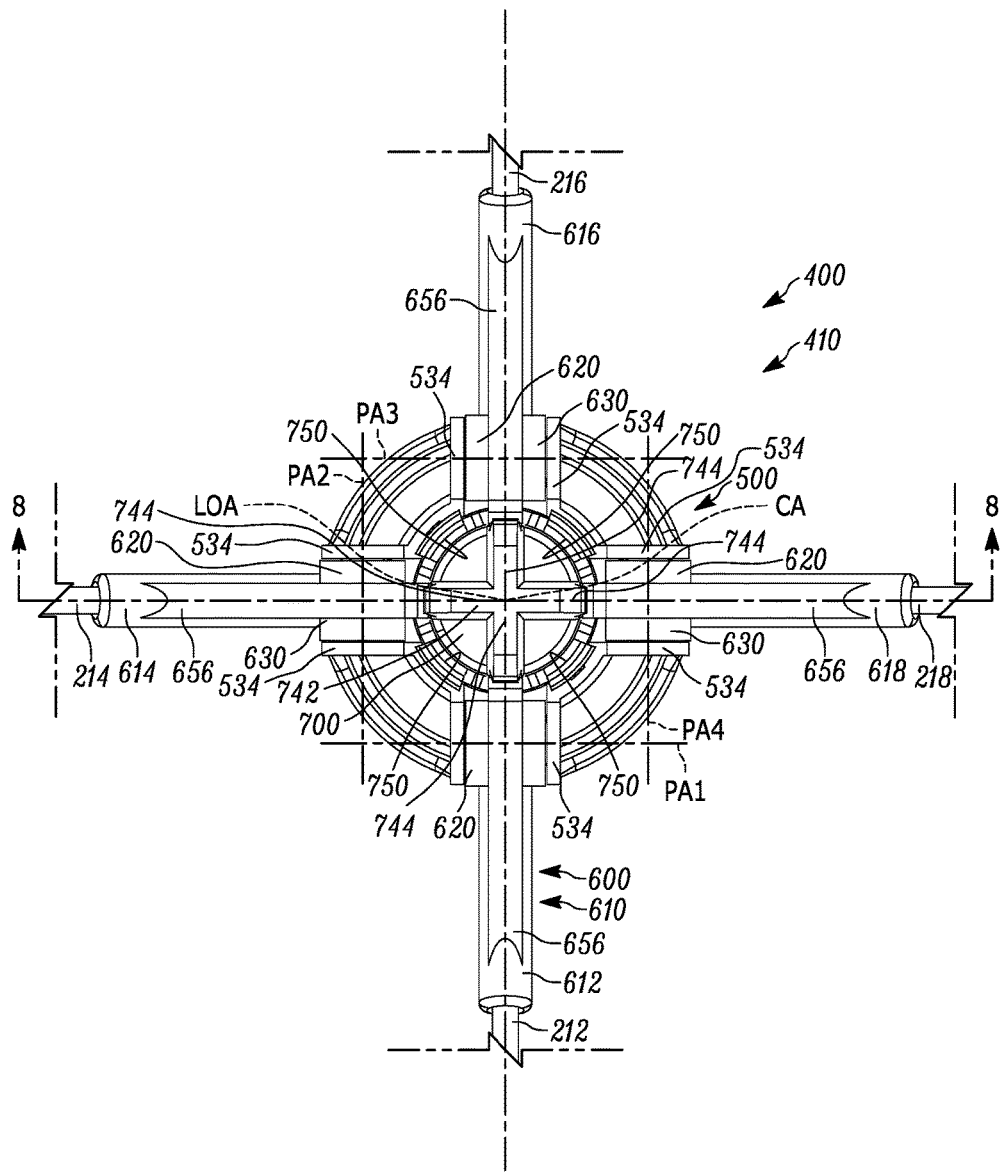
FIG. 7 is a bottom plan view of the actuation assembly of FIG. 5 with the actuation assembly in an open position.
Figure 8:
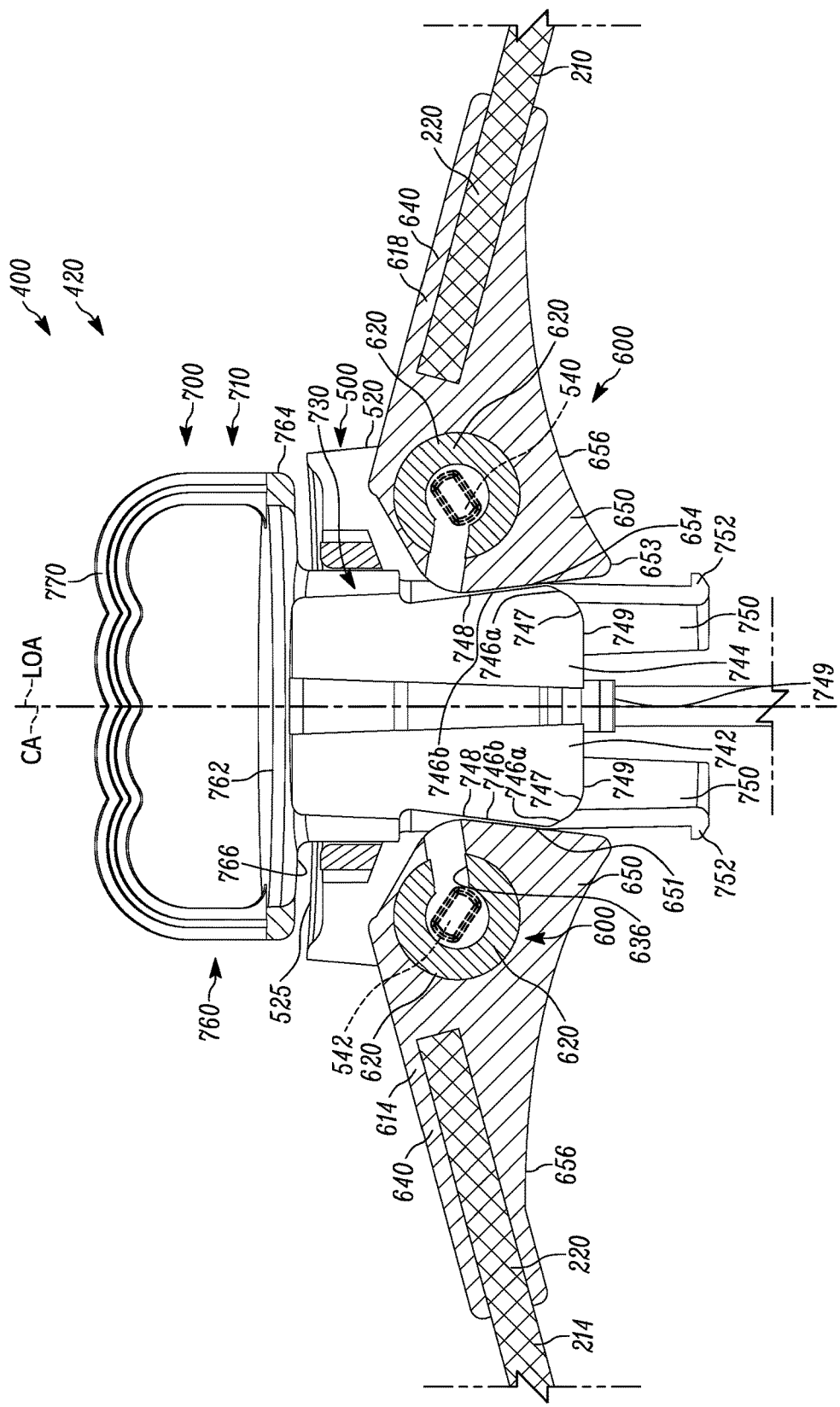
FIG. 8 is a schematic longitudinal section view of the actuation assembly of FIG. 5 in the open position, as seen from a plane indicated by the line 8-8 in FIG. 7.
Figure 9:
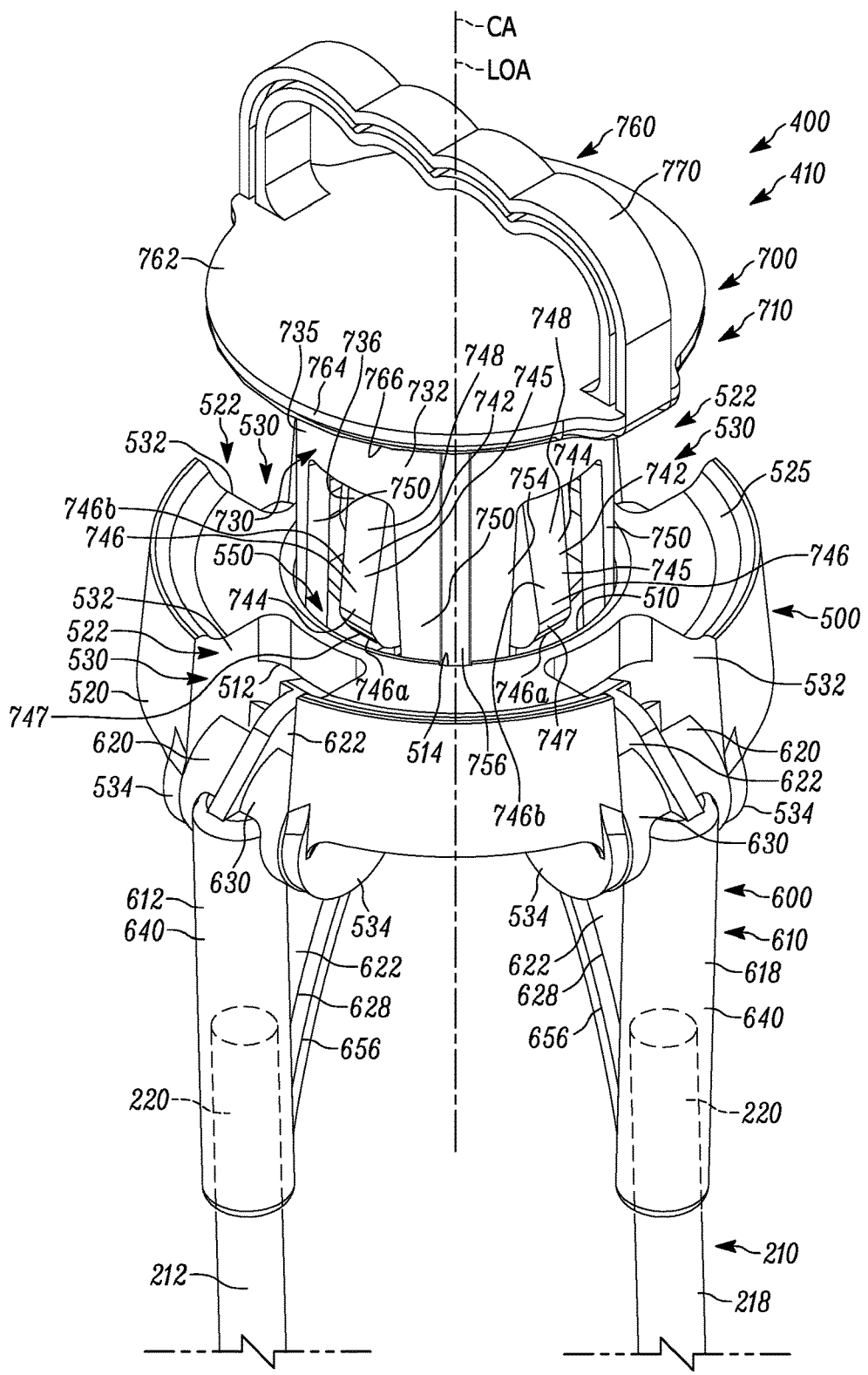
FIG. 9 is a schematic perspective view of the actuation assembly of FIG. 5 with the actuation assembly in a closed position.
Figure 10:
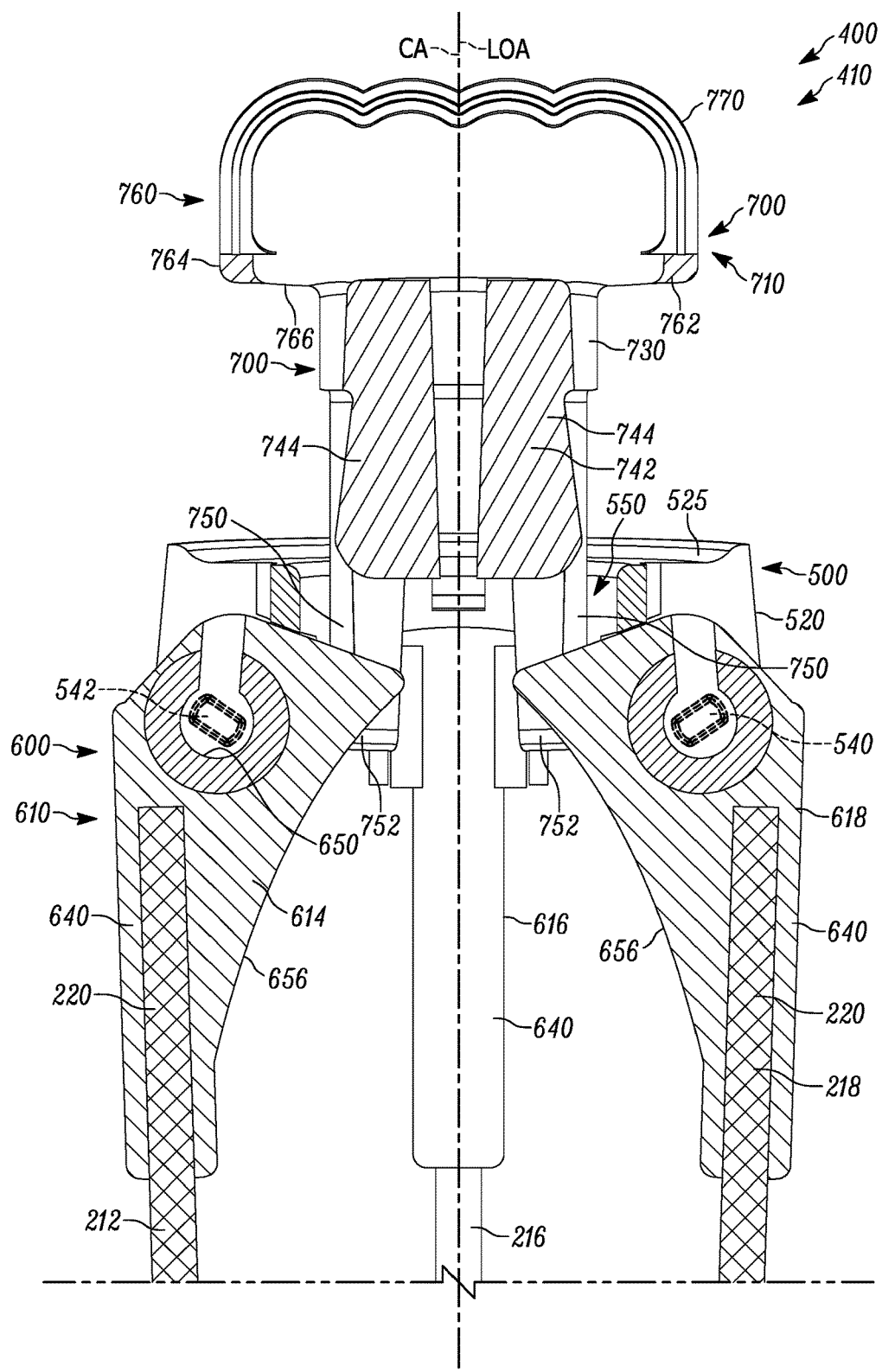
FIG. 10 is a schematic longitudinal section view of the actuation assembly of FIG. 5 in the closed position.
Figure 11:
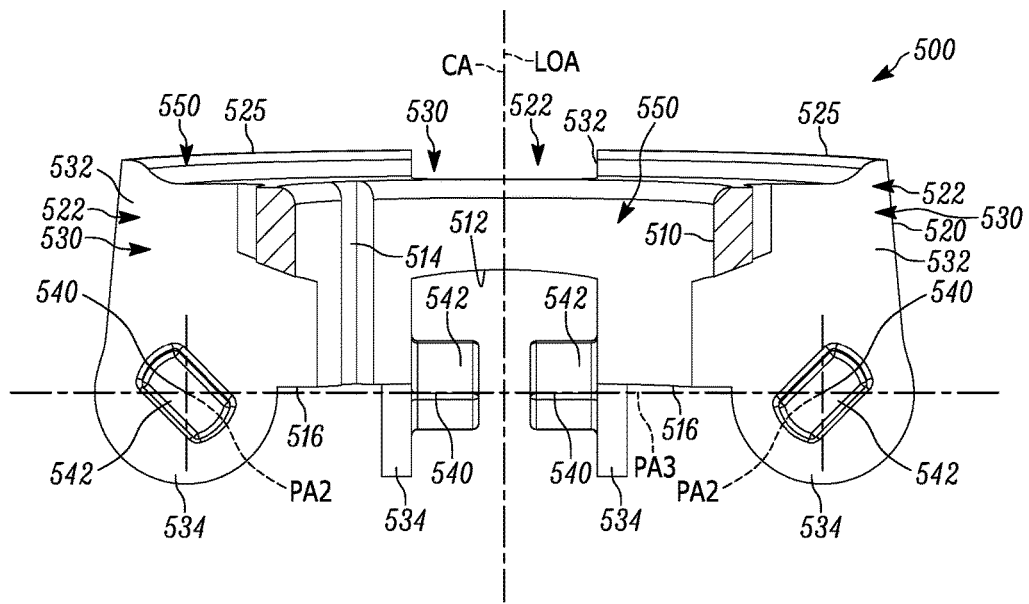
FIG. 11 is a schematic longitudinal section view of an annular base of the actuation assembly of FIG. 5.

As is best seen in FIGS. 5, 8, and 11, the annular base 500 includes an inner wall 510 and a radially spaced apart outer wall 520, bridged by an upper wall 525. The outer wall 520 includes a plurality of peripheral discontinuities 522 which extend radially inwardly into the upper wall 525 and toward the inner wall 510. Each of the plurality of discontinuities 522 defines a socket 530 that receives and pivotally supports a respective one of the plurality of rod supports 610. Each of the sockets 530 includes a pair of parallel facing side walls 532. Each of the socket side walls 542 include downwardly extending semi-circular lobe 534. Extending from each of the side walls 532, in the region of the lobe 534, is a pivot projection 540. The pivot projections 540 for a given socket 530 are aligned so as to form a pair of aligned stubshafts 542 which extend into first and second rotary bearings 632, 634 of a boss 620 defining a bearing assembly 630 of each of the plurality of rod supports 610 of the rod support assembly 600 to pivotally support the respective rod support 610. A central axis through the aligned pivot projections 540/stubshafts 542 of a given socket 530 defines the pivot axis PA1 for the rod support of the plurality of rod support 610 supported by socket 530. The four pivot axes PA1, PA2, PA3, PA4 are at the same axial height with respect to and are radially spaced from the plant cover central longitudinal axis CA. When view from above, the four pivot axes PA1, PA2, PA3, PA4 form a square which has as its center point the cover central axis CA. Thus, the four pivot axes PA1, PA2, PA3, PA4, taken together, are centered about the cover central CA.

Aligned with each of the four sockets 530 defined in the outer wall 520 of the annular base 500 are clearance slots 512 formed in the inner wall 510 of the base 500 to provide clearance for an upper region 652 of a contact projection 650 of the respective rod supports of the plurality of rod supports 610 when the rod supports 610 are in a first position corresponding to the upper or closed position 710 of the actuator 700. The inner wall 510 of the base 500 also includes two axially extending alignment slots 514 that slidingly receive coacting alignment ribs 756 formed in the outer surface 754 of two of four travel-limiting extensions 750 of the body 730 of the actuator 700 to insure that body 730 of the actuator 700 moves axially within the throughbore 550 along the cover central axis CA without rotation. In one exemplary embodiment, the alignment slots are 180° apart circumferentially.

Actuator 700

As is best seen in FIGS. 5, 6, 8-10, the actuator 700 includes the upper cover 760 and the annular body 730. The upper cover 760 includes a disk-shaped planar plate 762 and the handle 770. The generally U-shaped handle 770 of the actuator 700 extends upwardly from an outer edge 764 of the cover plate 762 to allow the user to grasp the handle 770 and move the actuator 700 along a vertical line of action LOA axially upward (in a direction labeled UP) and axially downward (in a direction labeled DW) along the cover central axis CA with respect to the base 500 to selectively move the actuator 700 between its closed or upper position 710 and its open or lower position 720. The actuator 700 moves along and is centered about the plant cover central axis CA. Stated another way, the line of action LOA of the actuator 700 is coincident with the cover central axis CA.

The actuator 700 further includes the body 730 extending axially below a bottom surface 766 of the cover plate 760. The body 730 includes an annular upper portion 732 and an actuation member 742. The annular upper portion 732 includes an inner surface 734, an outer surface 735 and a lower end 736. The actuation member 742 is generally X-shaped in radial cross section and extends from the inner surface 734 of the annular upper portion 732 of the body 730 and from the bottom surface 766 of the cover plate 760. As the actuator 700 is moved from its upper closed position 710 to its lower open position 720, the actuation member 742 contacts respective contact surfaces 654 of the plurality of pivoting rod supports 610 and thereby urges the plurality of pivoting rod supports 610 to pivot outwardly. That is, as the actuator 700 is moved axially downward (direction DW), the actuation member 742 contacts the contact surface 654 of each of the plurality of rod supports 610 to pivot the plurality rod supports 610 such that each of the respective second ends 230 of each of the plurality of rods 210 moves away from the central axis CA of the plant cover 100 and the plant cover 100 transforms to the expanded state 920.

In one exemplary embodiment, the actuation member 742 comprises four actuation arms 744 extending axially below a lower end 736 of the annular upper portion 732 of the body 730. The outer surface 745 of each of the four actuation arms 744 includes a contact surface 746 which contacts and sliding moves against the contact surface 654 of each of the plurality of rod supports 610 when the actuator 700 is moved axially downwardly DW. As best seen in FIG. 8, the contact surface 746 of the respective actuation arms 744 includes an arcuate region 744a and a planar rectangular region 744b and extends from an arcuate distal end portion 747 of the arm 744 to an upper portion 748 of the arm 744. For each of the four actuation arms 744, the arcuate distal end portion 747 of the arm 744 bridges the planar rectangular region 651 and a planar lower surface 749 of the arm 744. As the actuator 700 is moved downwardly DW along its line of action LOA to move from its closed position 710 to its open or downward position 720, the contact and sliding of the contact surface 746 of the four actuation arms 744 along and against the corresponding respective contact surface 654 of the rod supports 610 urges or forces the rod support 610 to pivot outwardly about their respective pivot axes PA1, PA2, PA3, PA4 thereby causing the actuation assembly 400 to move from its closed position 410 to its open position 420 and the plant cover to move from its collapsed state 910 to its open state 920.

An upper portion 747 of the outer surface 745 of the actuation arms 744 are slanted inwardly for clearance purposes. The actuation arms 744 are circumferentially spaced apart, each being approximately 90° apart. Between each adjacent pair of actuation arms 744 are the four travel limiting extensions 750. The extensions 750 extend axially downwardly from the lower end 736 of the annular upper portion 732 of the body 730 and are aligned with the outer surface 735 of the annular upper portion 732. At distal ends of the extensions 750 are L-shaped laterally extending end portions 752 which function to limit upward axial travel UP of the actuator 700 by bearing against the lower edge 516 of the inner wall 510 of the base 500. Downward axial travel DW of the actuator 700 is limited by contact between the bottom surface 766 of the planar plate 762 of the cover 760 of the actuator 700 and the upper wall 525 of the base 500. The outer surface 754 of two of the four extension 750 include vertical or axially extending alignment ribs 756 which are received in respective alignment slots 514 formed in the inner wall 510 of the base 500. The alignment ribs 756 continue upwardly on an outer surface 735 of the annular upper portion 732 of the lower body 730 and terminate at the lower surface 766 of the cover 760 of the actuator 700.

Rod Support Assembly 600

As is best seen in FIGS. 5 and 7-10, the rod support assembly 600 includes the plurality of pivoting rod supports 610. In one exemplary embodiment, there are four rod supports 612, 614, 616, 618, one rod support 610 for each of the plurality of sockets 530 of the annular base 500 of the actuation assembly 400. A single rod support 612 of the plurality of rod supports 610 will be described, it being understood that the description applies to all four individual rod supports. The rod support includes the boss 620 pivotally received in a socket 530 of the annular base 500. The boss 620 extends laterally from a central generally triangular web 622. The web 622 is generally triangular and extends between or bridges a rod receiving sleeve 640 disposed along one side 624 of the triangular web 622 and the contract projection 650 disposed along another second shorter side 626 of the triangular web 622. A convex arcuate wall 656 extends along a longest or third side 628 of the triangular web 622. A general extent of the web 622 is orthogonal to the pivot axis PA1 of the rod support 612.

In one exemplary embodiment, the rod support 612 is a substantially a right angled triangle and the convex arcuate wall 656 can be viewed as the hypotenuse of the right angled triangle. The boss 620 defines the bearing assembly 630 comprising the first and second rotary bearings 632, 634. The pair of pivot projections 540 formed in the facing side walls 532 of a socket 530 are received in respective ones of the first and second rotary bearings 632, 634 to pivotally support the rod support 612 for rotation or pivoting about the pivot axis PA1. Each of the rotary bearings 632, 634 of the rod support 612 includes a circumferential insertion opening 636 to allow the bearings 632, 634 to be inserted over and onto the respective pivot projections/stubshafts 540/542 of the socket 530 of the annular base 500 in an insertion orientation of the rod support 212.

The contact projection 650 of the rod support 612 includes the contact surface 654. The contact projection 650 is defined by an outer wall 651 that extends along the shorter side 626 of the triangular web 622 of the rod support 612, the outer wall 651 extending along a periphery of the web 622 and extending orthogonally to a general extent of the web 622. The contact projection 650 defines the contact surface 654 that includes a generally rectangular planar region 652 and a distal arcuate region 653. The distal arcuate region 653 bridges the planar rectangular region 651 and the convex arcuate wall 656 that extends along the third side 628 of the web 622. As the actuator 700 moves from its closed position 710 to its open position 720, the contact surface 746 of the actuation arm 744 of the actuator 700 engage and slide across the contact surface 654 of the contact projection 650 of the rod support 612 to pivot the rod support 612 about its pivot axis PA1, as described above.

Operation of Plant Cover 100

To transform or move the plant cover 100 of the first exemplary embodiment from the collapsed state 910 to the expanded state 920, the user grasps the handle 770 of the actuator 700 and pushes the actuator 700 in the downward direction DW along the plant cover central axis CA. In the collapsed state 910 of the plant cover 100, the actuation assembly 400 is in the closed position 410, which corresponds to the actuator 700 being in the closed or upper position 710. As the actuator 700 is moved in the downward direction DW from its closed position 710 to its open position 720, the beveled contact surface 746 of the actuation arm 744 of the actuation member 742 of the actuator 700 contacts, bears against, and slides across the contact surface 654 of the rod support 612 thereby pivoting the support 612 about its pivot axis PA1 such that the sleeve 640 pivots outwardly away from the plant cover central axis CA. Since the first end 220 of the rod 212 of the plurality of rods 210 is secured in the sleeve 640, outward pivoting of the sleeve 640 necessarily causes outward pivoting of the rod 210. (As noted above, the same operation occurs for all of the rod supports of the plurality of rod supports 610 and all of the rods of the plurality of rods 210 and all four of the actuation arms 744.) Since the canopy 300 is affixed to the rod 210 along a seam 330, outward pivoting of the rod 210 causes the peripheral edge PE of the canopy 300 to move radially outwardly from the cover central axis CA whereby the actuation assembly 400 is locked in the open position 420 and the plant cover 100 moves to and is locked into the expanded state 920 wherein the cover 100 assumes the open umbrella-type configuration 922.

In one exemplary embodiment, the plant cover 100 may be partially expanded and anchored to the ground using the plurality of loops 370 and stakes (not shown), as described above, prior to grasping and pushing the actuator 700 in the downward direction DW along the plant cover central axis CA to move the actuation assembly 400 from its closed position 410 to its open position 420. Partially expanding and anchoring the plant cover 100 to the ground prior to pushing the actuator 700 in the downward direction DW is especially helpful when moving to the expanded state 920 in larger sizes of the plant cover 100 or in plant covers 100 which have canopies 300 fabricated of heavier material or materials. In such cases of larger or heavier plant covers 100, partially expanding and anchoring the plant cover 100 to the ground prior will facilitate or make it easier for the user to push the actuator 700 fully downwardly into the open or lower position 420 of the actuator 700 wherein the plant cover 100 will move to and lock into the expanded state 920.

By contrast, to transform or move the plant cover 100 of the first exemplary embodiment from the expanded state 920 to the collapsed state 910, the user grasps the handle 770 of the actuator 700 and moves the actuator 700 in the upward direction UP along the plant cover central axis CA. In the expanded state 920 of the plant cover 100, the actuation assembly 400 is in the open position 420, which corresponds to the actuator 700 being in the open or lower position 720. As the actuator 700 is moved upwardly from its open position 720 to its closed position 710, the beveled contact surface 746 of the actuation arm 744 of the actuation member 742 of the actuator 700 slides and/or rolls across and ultimately disengages the arcuate contact surface 654 of the rod support 612 thereby allowing the support 612 to pivot about its pivot axis PA1 such that the sleeve 640 pivots inwardly toward the plant cover central axis CA. Since the first end 220 of the rod 212 of the plurality of rods 210 is secured in the sleeve 640, inward pivoting of the sleeve 640 necessarily causes inward pivoting of the rod 210. Since the canopy 300 is affixed to the rod 210 along a seam 330, inward pivoting of the rod 210 causes the peripheral edge PE of the canopy 300 to move radially inwardly toward the cover central axis CA and for the plant cover 100 to thereby move to the collapsed state 910 wherein the plant cover 100 assumes the compact cylindrical configuration 912.

Second Exemplary Embodiment—Plant Cover 1000

Figure 12:
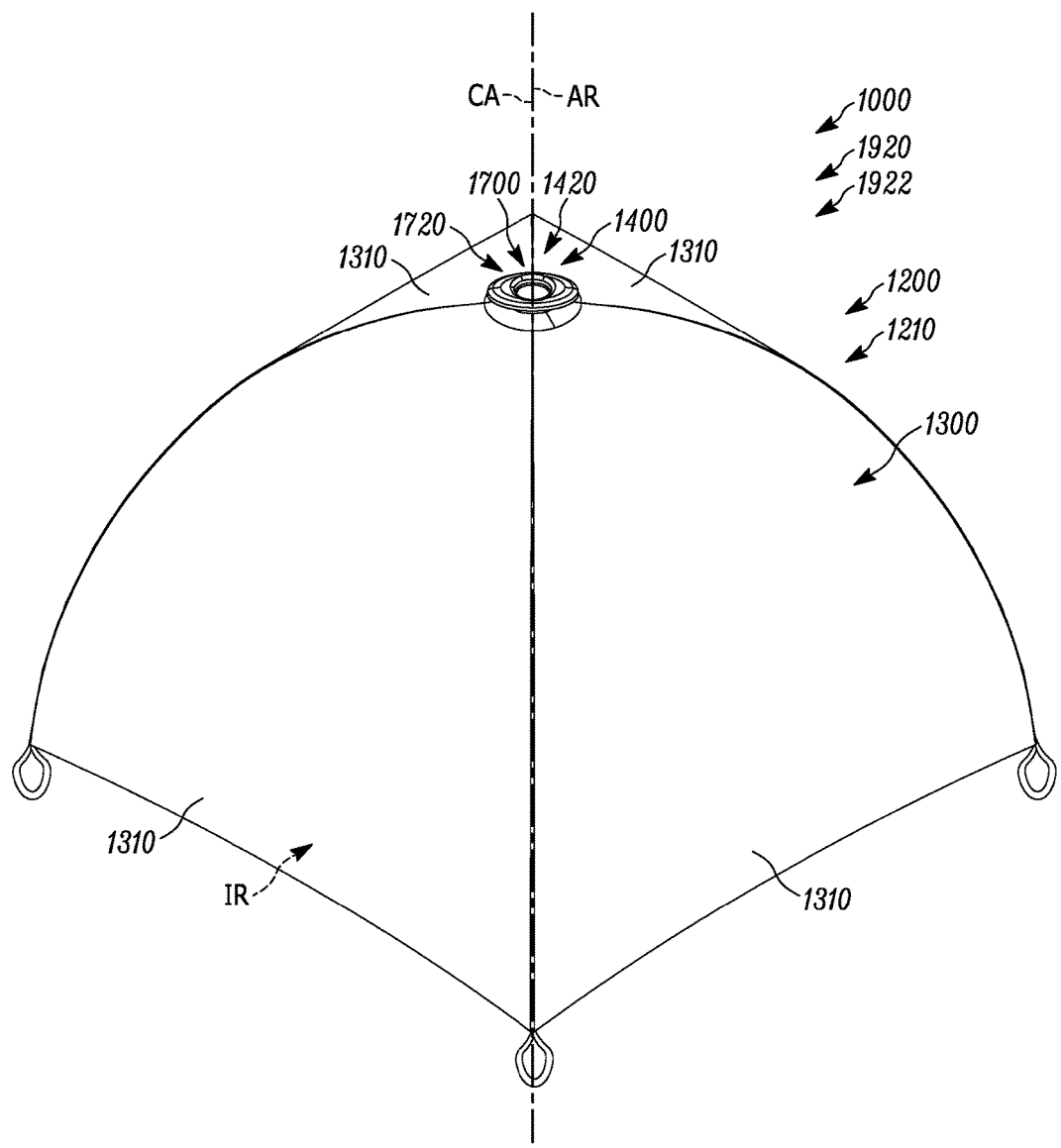
FIG. 12 is a schematic perspective view of a second exemplary embodiment of a plant cover of the present disclosure in an expanded state.
Figure 13:
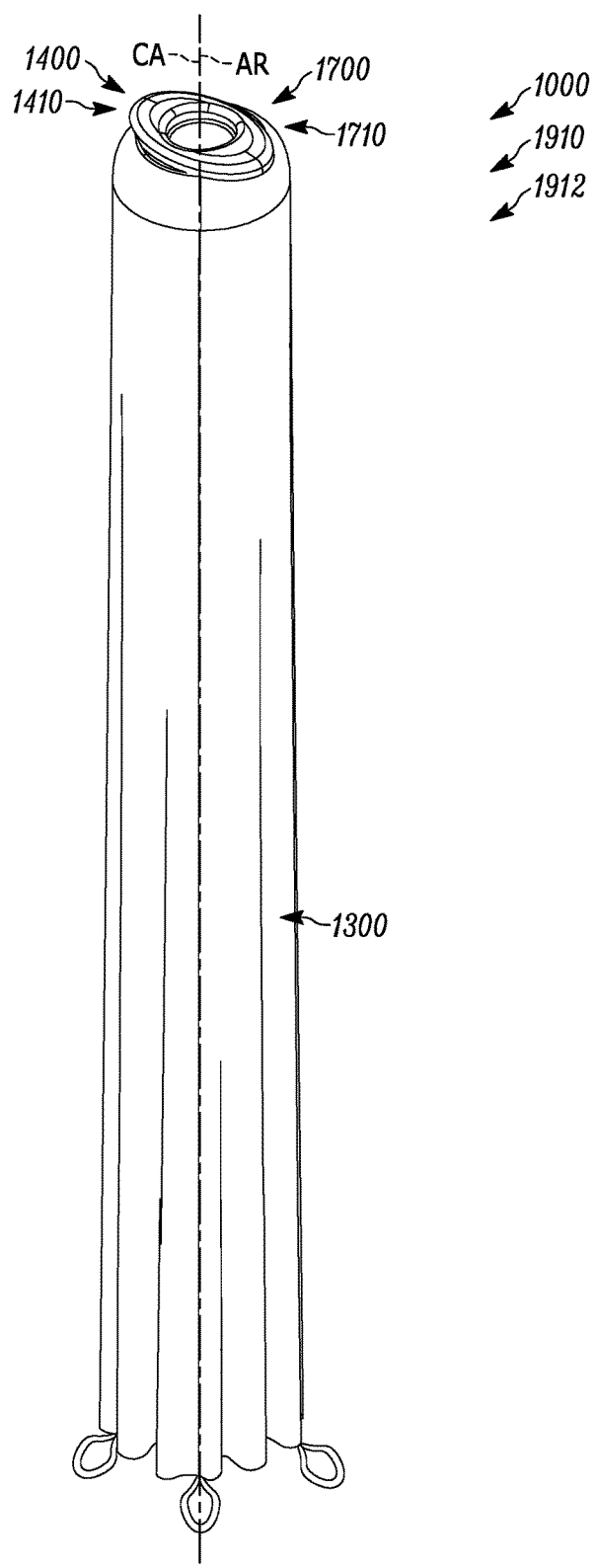
FIG. 13 is a schematic perspective view of the plant cover of FIG. 12 in a collapsed state.

FIGS. 12-20 schematically depict a second exemplary embodiment of a plant cover of the present disclosure, shown generally at 1000. FIG. 12 schematically depicts the plant cover 1000 in the expanded or open state 1920, while FIG. 13 schematically depicts the plant cover 1000 in the collapsed or folded state 1910. In the expanded state 1920, the plant cover 1000 is opened in an open umbrella-type configuration 1922, such that the cover 1000 may be suitably positioned to axially overlie and thereby protect vegetation, such as plants, shrubs and the like disposed within an outer perimeter OP of the cover 1000, that is, disposed within an interior region IR defined by the cover 1000. In the collapsed state 1910, the plant cover 1000 is retracted or folded into a closed umbrella-type or cylindrical configuration 1912. The cylindrical configuration 1912 is centered about and extends along a central longitudinal axis CA of the cover 1000 and in the collapsed state 1910, the volume interior region IR of the plant cover 1000 is negligible, that is, substantially zero or close to zero.

The plant cover 1000 includes a frame assembly 1200, including a plurality of rods 1210, and a foldable canopy 1300, including a plurality of canopy pieces 1310, similar in structure and function to the frame assembly 200 and the foldable canopy 300 of the plant cover 100 of the first exemplary embodiment. For brevity, the structural details/functions/advantages of the frame assembly 1200 and the canopy 1300 are not repeated in detail, those structural details/functions/advantages being generally the same as the structural details/functions/advantages discussed above with respect to the plant cover 100 which are hereby incorporated by reference.

Actuation Assembly 1400

As can best be seen in FIGS. 14-15 and 18, the plant cover 1000 also includes an actuation assembly 1400, which is similar to the actuation assembly 400 of the plant cover 100 in general function of transforming the plant cover 1000 between the collapsed and expanded states 1910, 1920, but includes certain structural differences discussed below. In one exemplary embodiment, the actuation assembly 1400 includes a stationary annular or cylindrical base 1500 defining a central throughbore 1550 centered about and extending along the central longitudinal axis CA of the plant cover 1000. The actuation assembly 1400 further includes an actuator 1700 received in the throughbore 1550 of the cylindrical base 1500 and rotatable about an axis of rotation AR that is substantially congruent or coincident with the plant cover central longitudinal axis CA. In one exemplary embodiment, the actuator 1700 is a generally disk-shaped rotation member that rotates about the axis of rotation AR and the central longitudinal axis CA of the plant cover 1000 between a closed position 1710, which corresponds to the closed position 1410 of the actuation assembly 1400, and an open position 1720, which corresponds to the open position 1410 of the actuation assembly. The actuator 1700 includes an upper cover 1760 affixed to a lower body 1730. The lower body 1730 extends into and rotates with respect to the throughbore 1550 of the base 1500. The upper cover 1760 of the actuator 1700 includes an oval-shaped handle 1770 which is grasped and rotated by a user to move the actuator 1700 between the closed position 1710 and the open position 1720. The handle 1770 includes a substantially vertical outer wall 1772 to allow the user more comfortable grip and a larger gripping surface for ease of rotation. The actuation assembly 1400 also includes the rod support assembly 1600 comprising the plurality of pivoting rod supports 1610 including individual rod supports 1612, 1614, 1616, 1618. The plurality of rod supports 1610 are supported by corresponding sockets of a plurality of sockets 1530 of the annular base 1500 and pivot about respective pivot axes PA1, PA2, PA3, PA4 defined by the sockets 1530 of the annular base 1500, as described with respect to the rod support assembly 600 and the annular base 500 of the actuation assembly 400 of the plant cover 100 of the first exemplary embodiment.

Annular Base 1500

Figure 14:
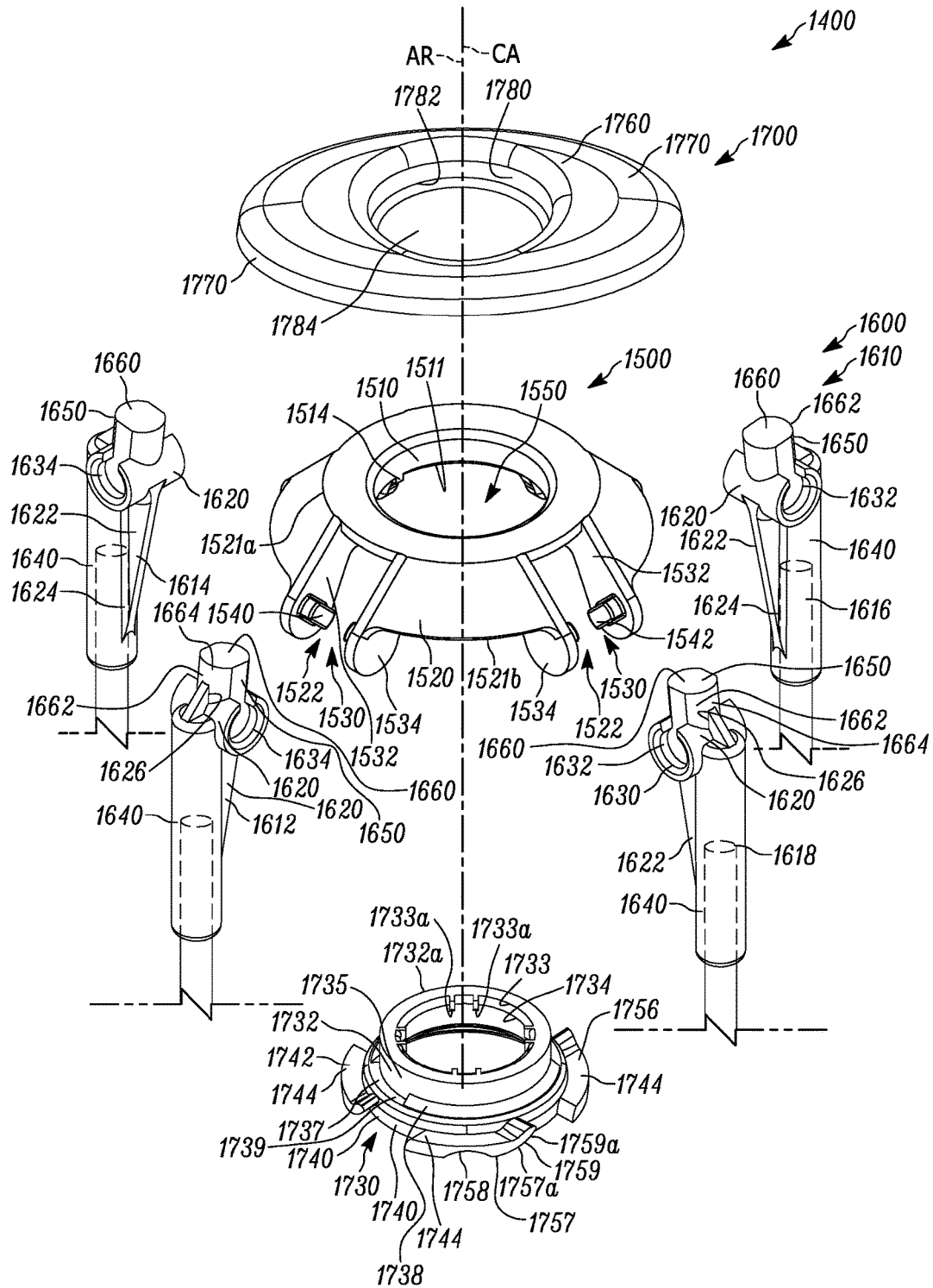
FIG. 14 is a schematic exploded top perspective view of an actuation assembly of the plant cover of FIG. 12.
Figure 15:
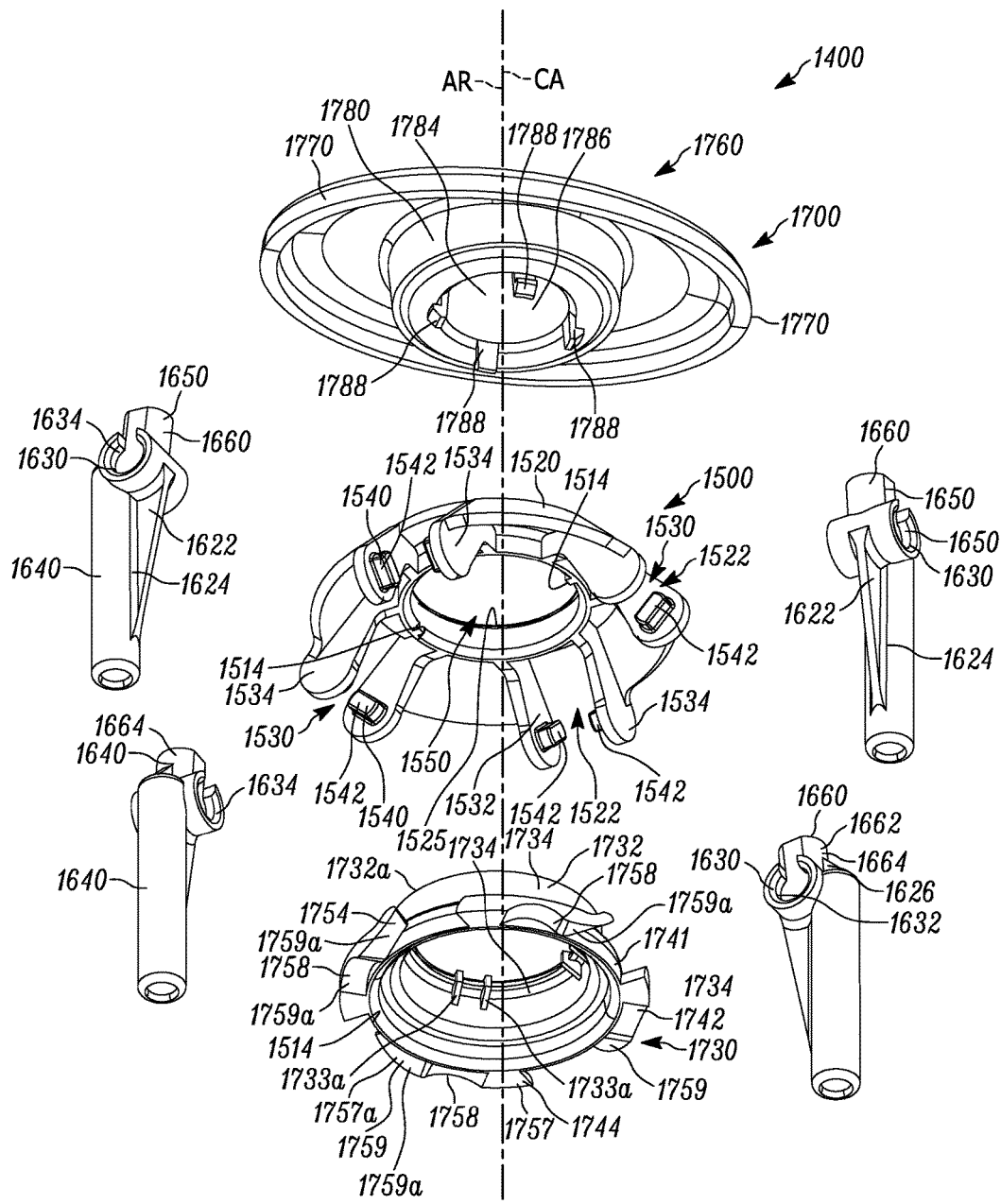
FIG. 15 is a schematic exploded bottom perspective view of the actuation assembly of FIG. 14.
Figure 16:
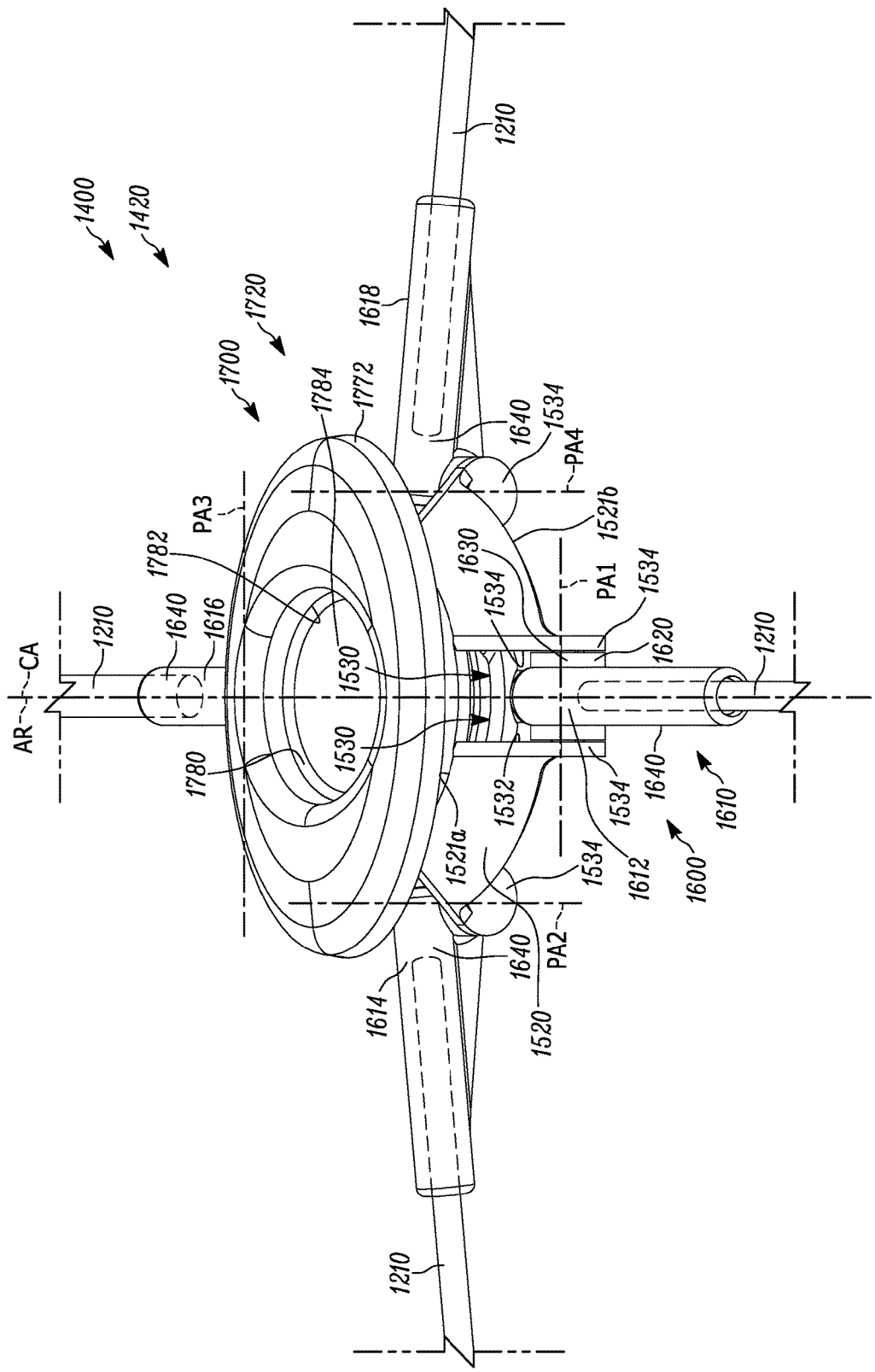
FIG. 16 is a schematic perspective view of the actuation assembly of FIG. 14 with the actuation assembly in an open position.
Figure 17:
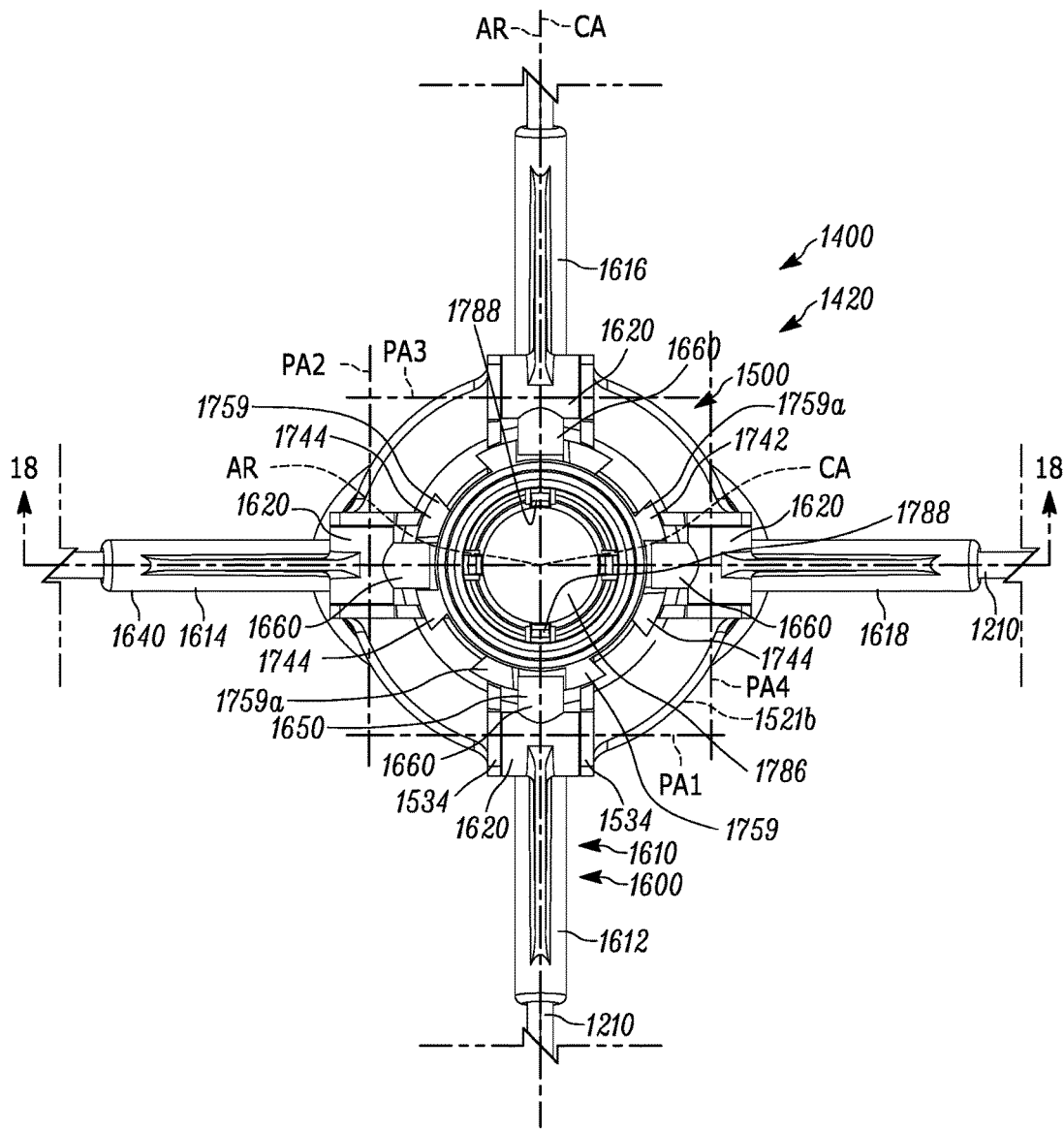
FIG. 17 is a schematic bottom plan view of the actuation assembly of FIG. 14 in the open position.
Figure 20:
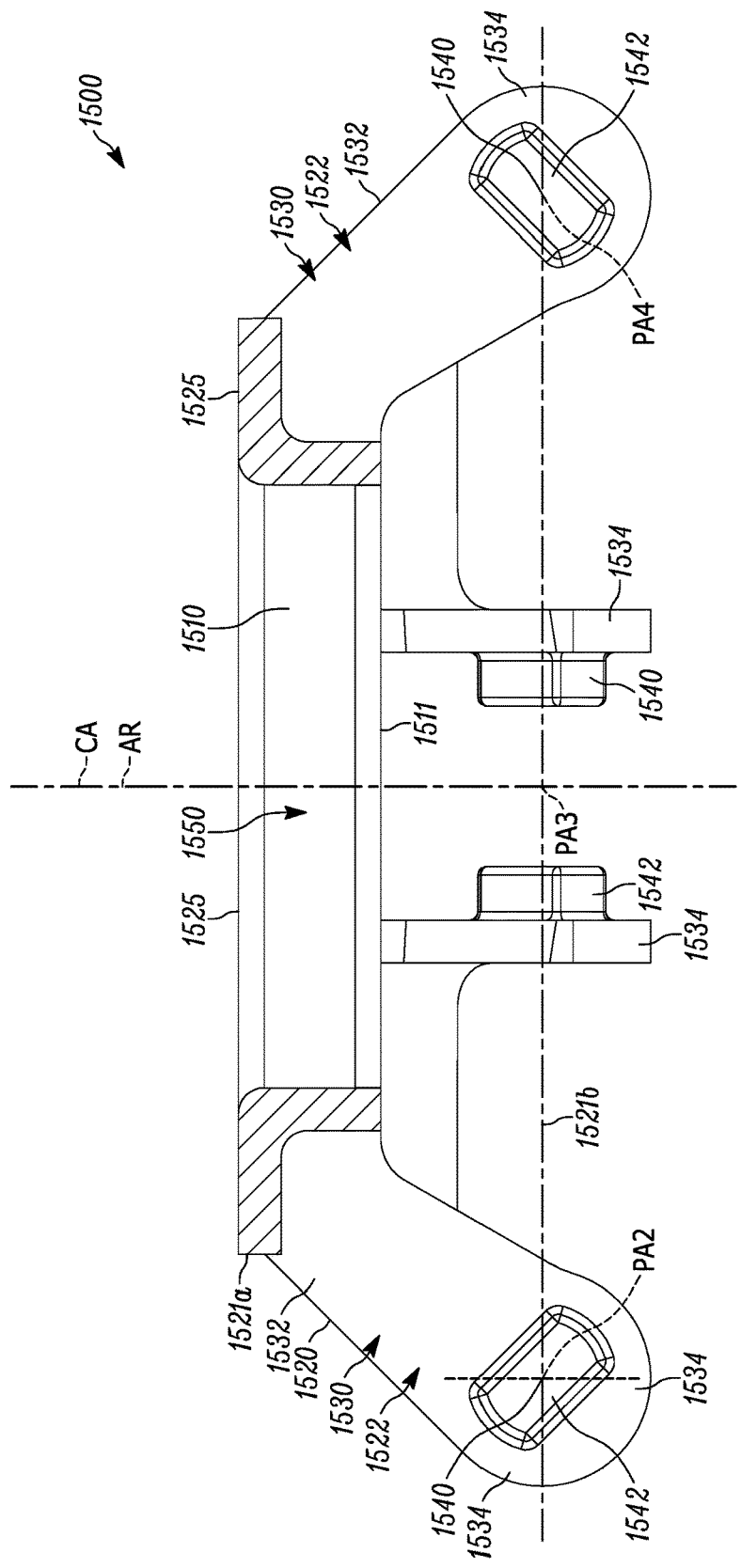
FIG. 20 is a schematic longitudinal section view of an annular base of the actuation assembly of FIG. 14.

As can best be seen in FIGS. 14-15 and 20, the annular base 1500 includes an inner wall 1510 and a radially spaced apart outer wall 1520, bridged by an upper wall 1525. The outer wall 1520, which is angled radially outwardly with respect to the plant cover central axis CA and the from an upper end 1521*a* (closer to the central axis CA and adjacent the upper wall 1525) to a lower end 1521*b*, includes a plurality of peripheral discontinuities 1522 which extend radially inwardly into the upper wall 1525 and toward the inner wall 1510. Each of the plurality of discontinuities 1522 defines a socket 1530 that receives and pivotally supports a respective one of the plurality of rod supports 1610. Each of the sockets 1530 includes a pair of parallel facing side walls 1532. Each of the socket side walls 1542 include downwardly extending semi-circular lobe 1534 which extends axially below the lower end 1521*b* of the outer wall 1520. Extending from each of the side walls 1532, in the region of the lobe 1534, is a pivot projection 1540. The pivot projections 1540 for a given socket 1530 are aligned so as to form a pair of aligned stubshafts 1542 which extend into first and second rotary bearings 1632, 1634 of a boss 1620 defining a bearing assembly 1630 of each of the plurality of rod supports 1610 of the rod support assembly 1600 to pivotally support the respective rod support 1610. A central axis through the aligned pivot projections 1540/stubshafts 1542 of a given socket 1530 defines the pivot axis PA1 for the rod support of the plurality of rod support 1610 supported by socket 1530. The four pivot axes PA1, PA2, PA3, PA4 are at the same axial height with respect to and are radially spaced from the plant cover central longitudinal axis CA. When view from above, the four pivot axes PA1, PA 2, PA3, PA4 form a square which has as its center point the cover central axis CA. Thus, the four pivot axes PA1, PA 2, PA3, PA4, taken together, are centered about the cover central axis CA.

A lower end 1511 of the inner wall 1510 of the annular base 1500 includes a pair of inwardly protruding fingers or rotation stops 1514. The pair of stops 1514 are positioned 180° apart about the lower periphery of the inner wall 1510 of the base 1550 and interfit respectively into a pair of circumferential gaps 1739 formed in a rotation limiting ring 1738 of the lower body 1730 of the actuator 1700. The function of the pair of stops 1514 of the base 1500 and the coacting rotation limiting ring 1738 of the actuator 1700 to limit the rotation of the actuator 1700 with respect to the annular base 1500 to a rotation of approximately 45° about the axis of rotation AR of the actuator 1700. That is, when the actuator 1700 is fully rotated in one direction, e.g., a clockwise direction, until the pair of stops 1514 prevent further rotation of the actuator 1700 about its axis of rotation AR, the actuator 1700 is in the closed position 1710 and the actuation assembly 1400 is also in the closed position 1410. By contrast, when the actuator 1700 is fully rotated in an opposite direction, e.g., a counterclockwise direction, until the pair of stops 1514 prevent further rotation of the actuator 1700 about its axis of rotation AR, the actuator 1700 is in the open position 1720 and the actuation assembly 1400 is also in the open position 1420.

Actuator 1700

Figure 18:
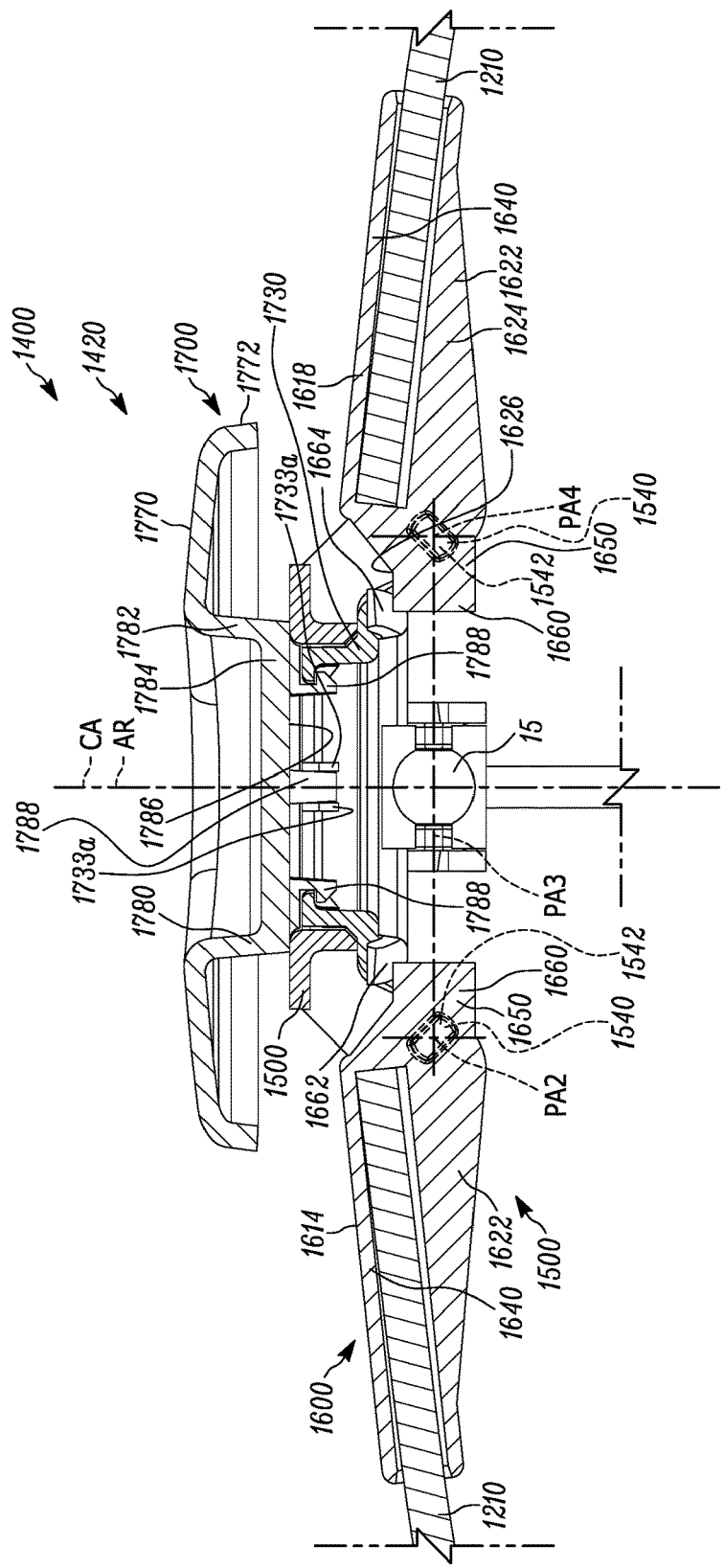
FIG. 18 is a schematic longitudinal section view of the actuation assembly of FIG. 14 in the open position, as seen from a plane indicated by the line 18-18 in FIG. 17.
Figure 19:
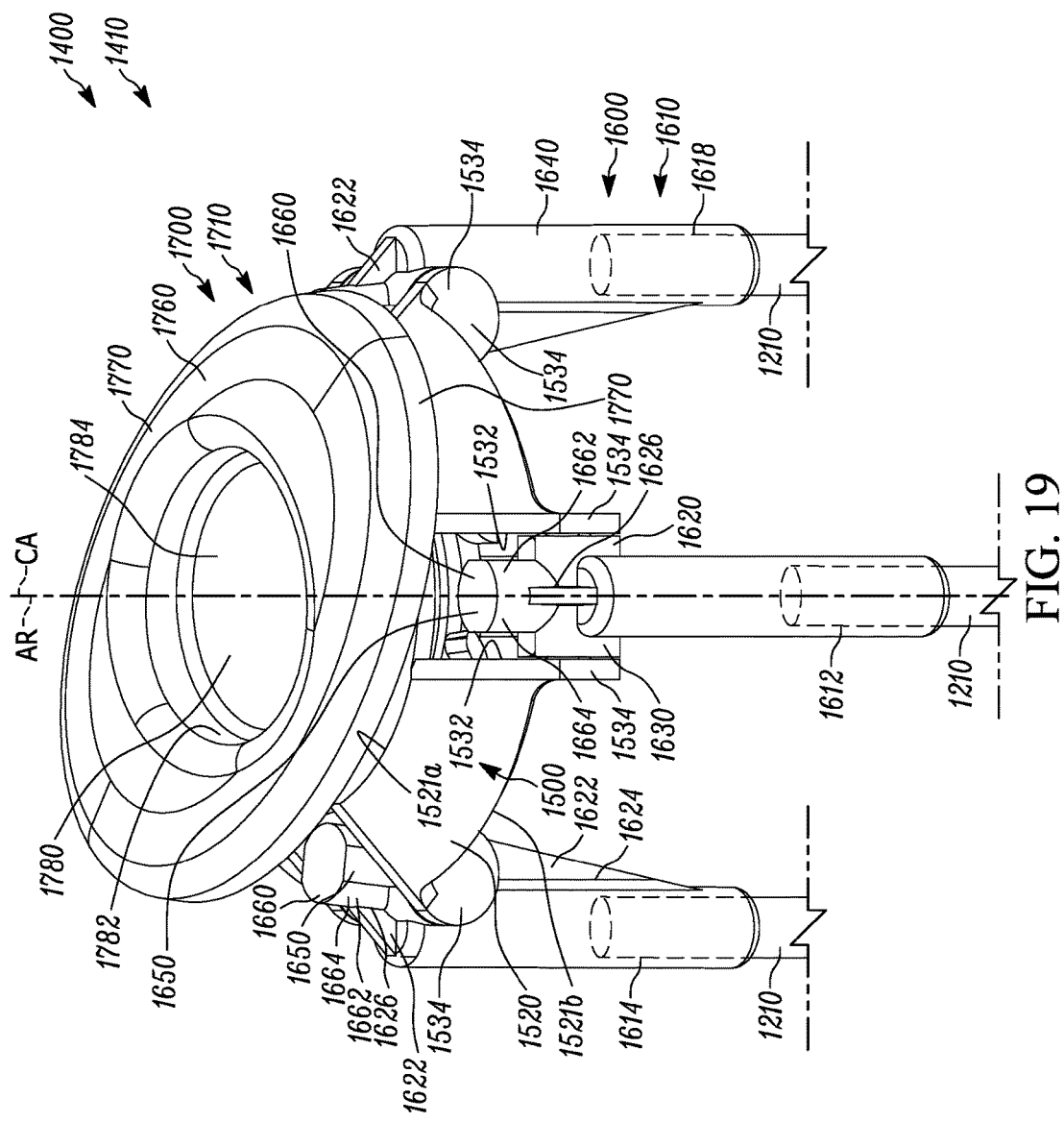
FIG. 19 is a schematic perspective view of the actuation assembly of FIG. 14 with the actuation assembly in a closed position.

As can best be seen in FIGS. 14-15 and 18, the actuator 1700 includes the lower body 1730 and the upper cover 1760. The upper cover 1760 includes the oval-shaped handle 1770 extending radially outwardly from a central annular body 1780. The handle 1770 includes the substantially vertically extending outer wall 1772 to allow the user more comfortable grip and a larger gripping surface for ease of rotation about the actuator axis of rotation AR. The central annular body 1780 includes a generally vertical side wall 1782 and a generally horizontally extending lower wall 1784. A lower surface 1786 of the central annular body lower wall 1784 includes four peripherally spaced apart generally J-shaped hooked tabs 1788 extending in an axially downward direction DW. The hooked tabs 1778 snap fit onto a radially inwardly extending collar 1733 formed at an upper end 1732a of an annular upper portion 1732 of the lower body 1730 of the actuator 1770 to secure the upper cover 1760 to the lower body 1730. The collar 1733 includes four pairs of alignment ribs 1733a that bear against the hooded tabs 1778 to prevent relative rotation between the upper cover 1760 and the lower body 1730 of the actuator 1700.

The lower body 1730 of the actuator 1700 include the annular upper portion 1732 and an annular lower portion 1740, having a slightly larger outer diameter. The annular upper portion 1732 includes an inner surface 1734 and a radially spaced apart outer surface 1735 and the collar 1733 at the upper end 1732a of the upper portion 1732. The annular lower portion 1740 includes an outer surface 1741. A horizontally extending shoulder 1737 bridges the outer surface 1734 of the upper portion 1732 and the outer surface 1741 of the lower portion 1740. The rotation limiting ring 1738 is disposed adjacent the intersection of the horizontally extending shoulder 1737 and the outer surface 1734 of the upper portion 1732.

Extending radially outwardly from the outer surface 1741 of the lower portion 1740 of the lower body 1730 of the actuator 1700 is an actuation member 1742. In one exemplary embodiment, the actuation member 1742 comprises four peripherally spaced apart arcuate actuation arms 1744. Each of the actuation arms 1744 includes a generally planar upper surface 1756 and an axially spaced apart lower surface 1757. The lower surface 1757 defines a contact surface 1757a of the actuation arm 1744. The contact surface 1757a includes an arcuate recess 1758 to receive and stably retain an arcuate contact surface 1662 of an oval-shaped post 1660. The oval-shaped post 166 defines a contact projection 1650 for each of the four rod supports 1612, 1614, 1616, 1618 of the plurality of pivoting rod supports 1610 of the rod support assembly 1600. A forward or leading edge 1759 of the lower surface 1757 each of the actuation arms 1744 includes a beveled surface 1759a. The forward or leading edge 1759 is that end of the actuation arm 1744 that is forward, when viewed from above, when the actuator 1700 being rotated about its axis of rotation AR in the counterclockwise direction to move from the closed position 1710 to the open position 1720. The beveled leading edge 1759 is part of the contact surface 1757a of the actuation arms 1744. Rotation of the actuator 1700 and bearing and sliding of the four contact surfaces 1757a of the actuation member 1742 against the arcuate contact surface 1662 of the contact projection 1650 of the rod supports 1612, 1614, 1616, 1618 of the plurality of rod supports 1610 causes the plurality of rod supports 1610 to be pivoted in an outward direction, about their respective pivot axes PA1, PA2, PA3, PA4, such that plurality of rods 1210 move away from the plant cover central axis CA as the actuator 1700 moves from the closed position 1710 to the open position 1720, that is, as the actuation assembly 1400 moves from the closed position 1410 to the open position 1420 and, that is, as the plant cover 1000 moves from the collapsed stated 1910 to the expanded state 1920.

Rod Support Assembly 1600

As can best be seen in FIGS. 14-19, the rod support assembly 1600 includes the plurality of pivoting rod supports 1610. In one exemplary embodiment, there are four rod supports 1612, 1614, 1616, 1618, one rod support 1610 for each of the plurality of sockets 1530 of the annular base 1500 of the actuation assembly 1400. A single rod support 1612 of the plurality of rod supports 1610 will be described, it being understood that the description applies to all four individual rod supports. The rod support includes the boss 1620 pivotally received in a socket 1530 of the annular base 1500. The boss 1620 extends laterally from a central generally triangular web 1622. The web 1622 extends between or bridges a rod receiving sleeve 1640 disposed along one side 1624 of the triangular web 1622 and the contract projection 1650 disposed along another shorter side 1626 of the triangular web 1622. The boss 1620 defines the bearing assembly 1630 comprising the first and second rotary bearings 1632, 1634. The pair of pivot projections 1540 formed in the facing side walls 1532 of a socket 1530 are received in respective ones of the first and second rotary bearings 1632, 1634 to pivotally support the rod support 1612 for rotation or pivoting about the pivot axis PA1.

The shorter side 1626 of the triangular web 1622 of the rod support 1612 includes the contact projection 1650. In one exemplary embodiment, the contact projection 1650 includes a generally oval-shaped post 1660. An upper distal region 1664 defines the arcuate contact surface 1662 of the contact projection 1650. The contact surface 1662 engages and slide across the contact surface 1757*a* of the lower surface 1757 of the actuation arm 1744 of the actuation member 1742 of the actuator 1700 as the actuator 1700 is rotated about its axis of rotation AR when moving from its closed position 1710 to it open position 1720 and vice versa. In the open position 1720 of the actuator 1700, the contact surface 1662 of the contact projection 1650 of the rod support 1612 is firmly received, in a detent-like fashion, in the arcuate recess 1758 of the contact surface 1757*a* of the lower surface 1757 of the actuation arm 1744 of the actuator 1700 thereby locking the actuation assembly 1400 in the open position 1420 and the plant cover 1000 in the expanded state 1920.

Operation of Plant Cover 1000

To transform or move the plant cover 1000 of the second exemplary embodiment from the collapsed state 1910 to the expanded state 1920, the user must first partially expand the cover 1000. In one exemplary embodiment, the plant cover 1000 may be partially expanded and anchored to the ground using a plurality of loops and stakes, as explained with respect to the first embodiment. In the partially expanded state, the oval-shaped post 1660 of the each of the rod supports of the plurality of rod supports 1610 will be in a position such that as the actuator 1700 is rotated in the counterclockwise direction (when viewed from above the plant cover 1000) about the actuator axis of rotation AR and the plant cover central axis CA, the beveled leading edges 1759 of the actuation member 1742 will contact and engage the respective arcuate contact surfaces 1662 of the posts 1660. This, in turn, will cause each of the plurality of rod supports 1610 to pivot about their respective pivot axes PA1, PA2, PA3, PA4 such that the sleeve 1640 of each rod support 1610 pivots outwardly away from the plant cover central axis CA and away from the actuator axis of rotation AR.

In the collapsed state 1910 of the plant cover 1000, the actuation assembly 1400 is in the closed position 1410, which corresponds to the actuator 1700 being in the closed position 1710. As the actuator 1700 is rotated in the counterclockwise direction from its closed position 1710 to its open position 1720, the contact surface 1757*a* of each of the actuation arm 1744 of the actuation member 1742 of the actuator 1700 contacts, bears against, and slides across the corresponding arcuate contact surface 1662 of the rod support 1612 thereby pivoting the support 1612 about its pivot axis PA1 such that the sleeve 1640 pivots outwardly away from the plant cover central axis CA. Since the first end of the rod 1212 of the plurality of rods 1210 is secured in the sleeve 1640, outward pivoting of the sleeve 1640 necessarily causes outward pivoting of the rod 1210. (As noted above, the same operation occurs for all of the rod supports of the plurality of rod supports 1610 and all of the rods of the plurality of rods 1210 and all four of the actuation arms 1744.) Since the canopy 1300 is affixed to the rod 1210 along a seam, outward pivoting of the rod 1210 causes the peripheral edge PE of the canopy 1300 to move radially outwardly from the cover central axis CA and for the plant cover 1000 to move from a partially expanded (which the user put the plant cover 1000 into prior to rotating the actuator 1700) to the fully expanded state 1920 wherein the cover 1000 moves to and is locked into the open umbrella-type configuration 1922.

By contrast, to transform or move the plant cover 1000 of the second exemplary embodiment from the expanded state 1920 to the collapsed state 1910, the user grasps the handle 1770 of the actuator 1700 and rotates the actuator 1700 in the clockwise direction (when viewed from above the cover 1000) about the plant cover central axis CA and the axis of rotation AR. In the expanded state 1920 of the plant cover 1000, the actuation assembly 1400 is in the open position 1420, which corresponds to the actuator 1700 being in the open position 1720. As the actuator 1700 is rotated in the clockwise direction from its open position 1720 to its closed position 1710, the contact surface 1757*a* of the actuation arm 1744 of the actuation member 1742 of the actuator 1700 slides across and ultimately disengages the arcuate contact surface 1662 of the rod support 1612 thereby allowing the support 1612 to pivot about its pivot axis PA1 such that the sleeve 1640 pivots inwardly toward the plant cover central axis CA. Since the first end of the rod 1212 of the plurality of rods 1210 is secured in the sleeve, inward pivoting of the sleeve 1640 necessarily causes inward pivoting of the rod 1210. Since the canopy 1300 is affixed to the rod 1210 along a seam, inward pivoting of the rod 1210 causes the peripheral edge PE of the canopy 1300 to move radially inwardly toward the cover central axis CA and for the plant cover 1000 to thereby move, at least partially, toward the collapsed state 1910. Since the disengagement of the actuation member 1742 of the actuator 1700 from the arcuate contact surface 1662 of the rod support 1612 occurs before the plant cover 100 is transformed into its fully collapsed state 1910, the user will likely need to manually apply pressure to and push the rods of the plurality of rods 1210 radially inwardly to insure that the plant cover 1000 is moved or transformed into its fully collapsed state 1910 and wherein the plant cover 1000 assumes the compact cylindrical configuration 1912.

Third Exemplary Embodiment—Plant Cover 2000

Figure 21:
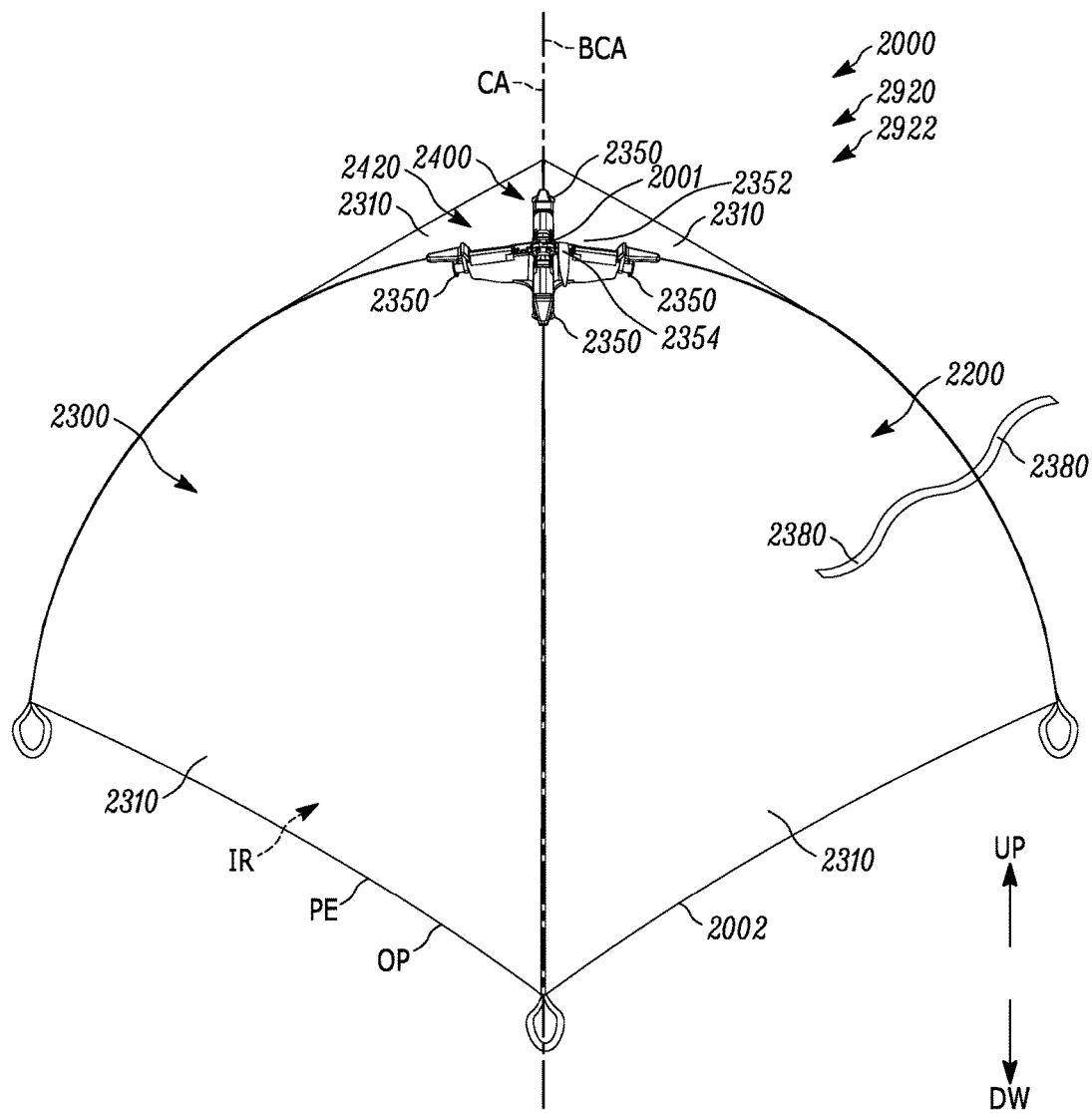
FIG. 21 is a schematic perspective view of a third exemplary embodiment of a plant cover of the present disclosure in an expanded state.
Figure 22:
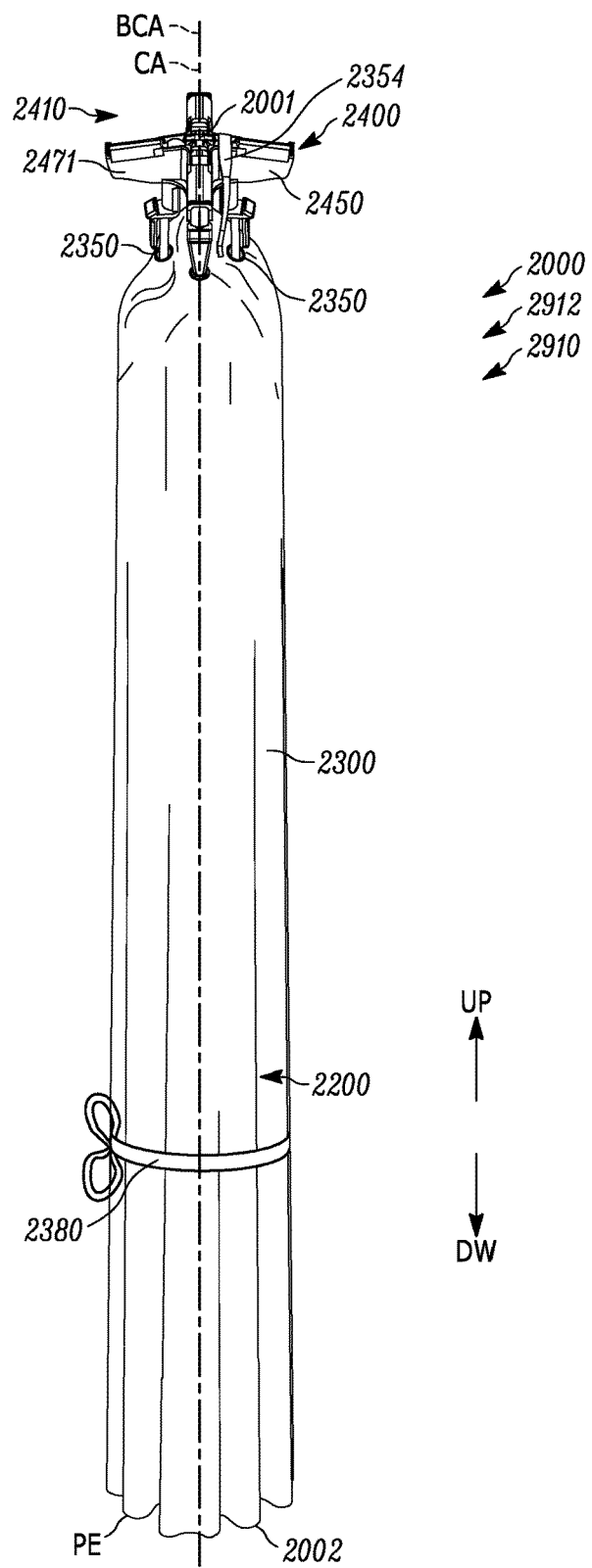
FIG. 22 is a schematic perspective view of the plant cover of FIG. 21 in a collapsed state.
Figure 23:
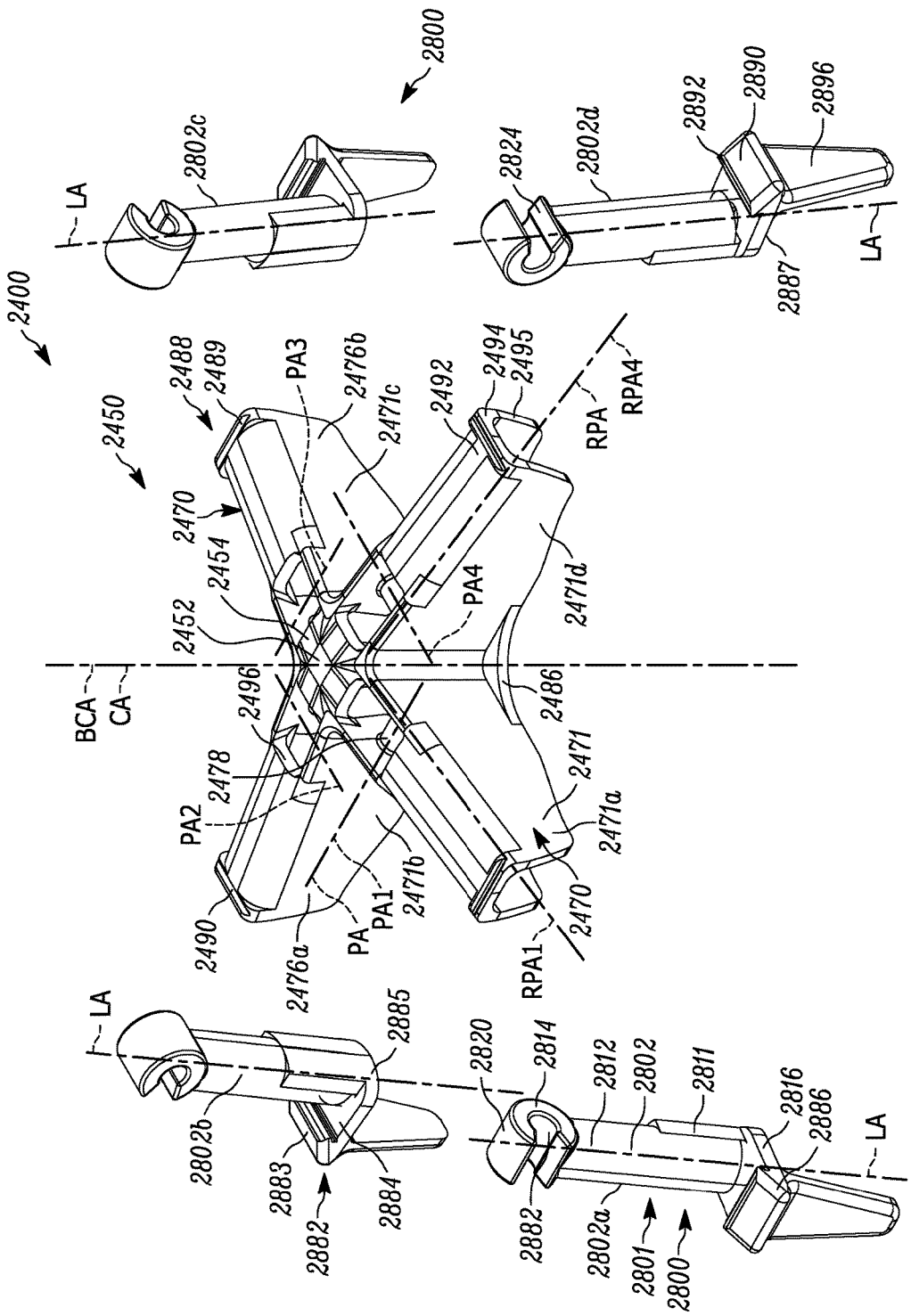
FIG. 23 is a schematic exploded top perspective view of a pivoting support assembly of the plant cover of FIG. 21 including a stationary brace and a rod support assembly including a plurality of pivoting rod supports that pivot with respect to the brace to move the pivoting support assembly between an open position and a closed position and thereby move the plant cover between the expanded state and the collapsed state.
Figure 24:
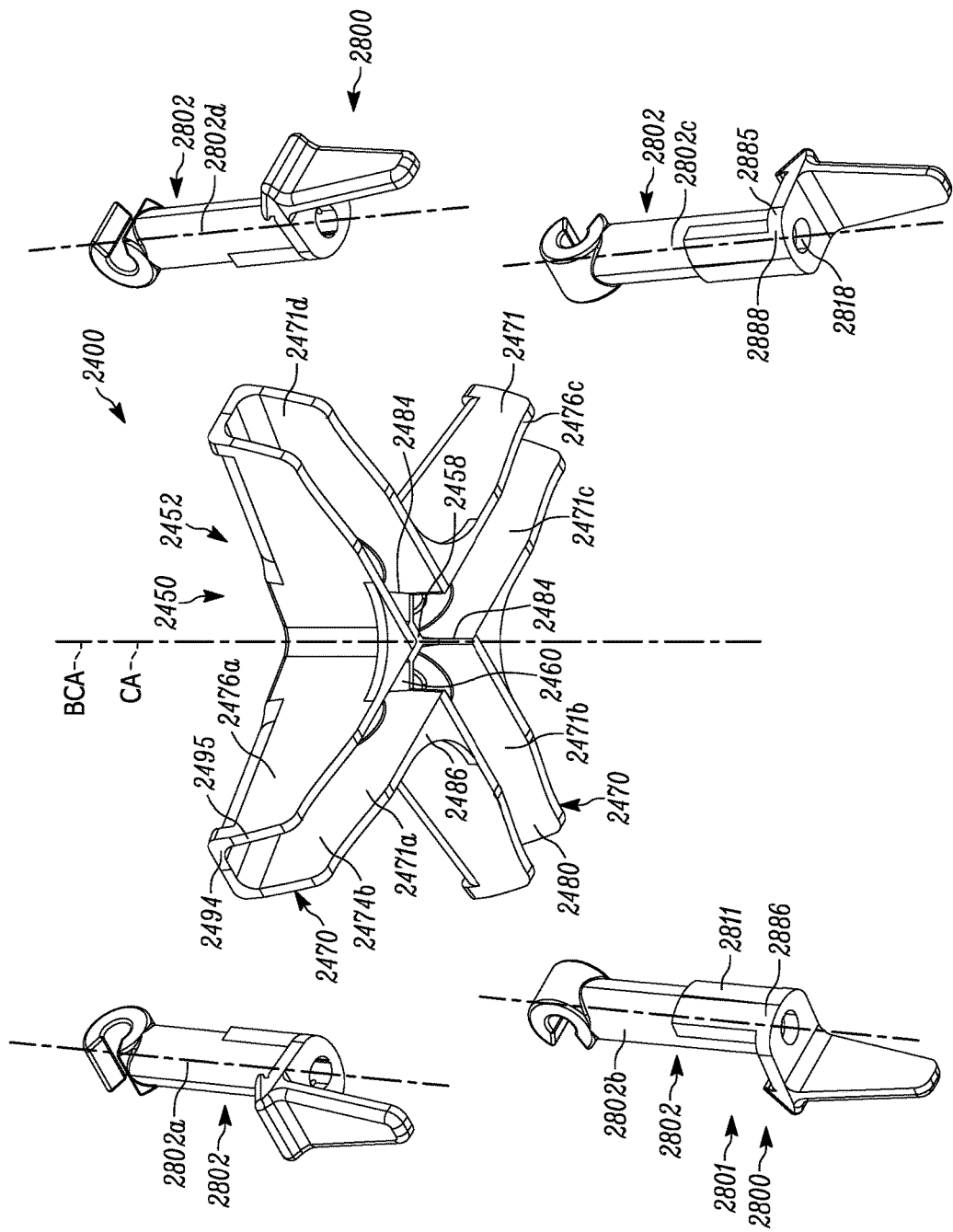
FIG. 24 is a schematic exploded bottom perspective view of the pivoting support assembly of FIG. 23.

FIGS. 21-33 schematically depict a third exemplary embodiment of a plant cover of the present disclosure, shown generally at 2000. FIG. 21 schematically depicts the plant cover 2000 in the expanded or open state 2920, while FIG. 22 schematically depicts the plant cover 2000 in the collapsed or folded state 2910. In the expanded state 2920, the plant cover 2000 is opened in an open umbrella-type configuration 2922, such that the cover 2000 may be suitably positioned to axially overlie and thereby protect vegetation, such as plants, shrubs, nursery stock, saplings, and the like disposed within an outer perimeter OP of the cover 2000, that is, disposed within an interior region IR defined by the cover 2000. The outer perimeter OP of the cover 200 is defined by a lower peripheral edge PE of the canopy 2300. In the collapsed state 2910, the plant cover 2000 is retracted or folded into a closed umbrella-type or generally cylindrical configuration 2912, most suitable for storage or transportation of the plant cover 2000. The cylindrical configuration 2912 of the plant cover 2000 is centered about and extends along a central longitudinal axis CA of the cover 2000 and in the collapsed state 2910, the volume interior region IR of the plant cover 2000 is relatively small, that is, substantially zero or close to zero. The open configuration 2922 of the plant cover 2000 is also centered about and extends along the central longitudinal axis CA, however, as the outer perimeter OP is spaced from the central longitudinal axis CA, the volume of the interior region IR is at a maximum for the plant cover 2000. For purposes herein, the term axial shall mean in a direction along or in a direction parallel to the central longitudinal axis CA of the plant cover 2000, an upward direction UP (FIGS. 21 and 22) shall mean in a direction generally along or parallel to the central longitudinal axis CA in a direction toward an upper end 2001 of the plant cover 2000, while a downward direction DW shall mean in a direction generally along or parallel to the central longitudinal axis CA in a direction toward a lower end 2002 of the plant cover 2000.

The plant cover 2000 includes a frame assembly 2200, including a plurality of rods 2210, and a foldable canopy 2300, including a plurality of canopy pieces 2310, similar in structure and function to the frame assembly 200 and the foldable canopy 300 of the plant cover 100 of the first exemplary embodiment. Each of the rods of the plurality of rods 2210 is pivotally supported by a corresponding pivoting rod support of a plurality of rod supports 2801 of a rod support assembly 2800. The rod support assembly 2800, in turn, is part of a pivoting support assembly 2400 of the plant cover 2000. The pivoting support assembly 2400 includes a brace 2450 which pivotally supports each of pivoting rod supports of the plurality of rod supports 2801 for pivoting movement between an open position 2420 of the pivoting support assembly 2400, corresponding to the expanded state 2920 of the plant cover 2000, and a closed position 2410, corresponding to the collapsed state 2910 of the plant cover 2000.

In one exemplary embodiment, the foldable canopy 2300 includes a plurality of spaced apart openings 2350, each opening fitted with a grommet for tear resistance and durability, disposed in an upper portion 2352 of the canopy 2300. In one example embodiment, the number of openings 2350 in the upper end of the canopy 2300 is four corresponding to four rods comprising the plurality of rods 2210, although it should be appreciated that the number of rods of the plurality of rods 2210 and therefore, the number of openings in the canopy 2300, may be more or less than four depending on the desired size, shape, load bearing requirements of the plant cover 2000. The plurality openings 2350 are concentric about the central longitudinal axis CA of the plant cover 2000. Individual rods of the plurality of rods 2210 extend from individual pivoting rod supports of the plurality of pivoting rod supports 2801 of the pivoting rod assembly 2800 and extend through the respective grommet openings of the plurality of openings 2350. Advantageously, a loop 2354 may be affixed to the upper portion 2352 of the canopy 2300. The loop 2354 is looped around the brace 2450 of the pivoting support assembly 2400 to secure the canopy 2300 to the pivoting support assembly 2400. The loop 2352 prevents the canopy 2300 from slipping off the plurality of rods 2210, which may otherwise happen when the plant cover 2000 is in the collapsed state 2910.

For brevity, the structural details/functions/advantages of the frame assembly 2200, as well as other aspects of the plant cover 2000, which are the same as or similar to the corresponding structural details/functions/advantages of the previously described plant covers 100, 1000 will not be repeated, the structural details/functions/advantages discussed above with respect to the plant covers 100 and/or 1000 are hereby incorporated by reference.

Pivoting Support Assembly 2400

As can best be seen in FIGS. 23-30, the plant cover 2000 also includes an pivoting support assembly 2400, which supports the frame assembly 2200 and the canopy 2300 and permits the plant cover 2000 to be readily transformed between the collapsed and expanded states 2910, 2920. In one exemplary embodiment, the pivoting support assembly 2400 extends through the opening 2350 in the canopy 2300 and includes a stationary brace 2450 centered about the central longitudinal axis CA of the plant cover 2000 and a rod support assembly 2800 including a plurality of pivoting rod supports 2801. The brace 2450 is centered about the cover central axis CA and disposed above the canopy 2300 so that the pivoting support assembly 2400 advantageously may be actuated by a user of the plant cover 2000 standing above and being completely outside of the interior region IR of the plant cover 100 to move the cover 2000 from the collapsed state 2910 to the expanded state 2920 and vice versa.

The plurality of pivoting rod supports 2801 of the rod support assembly 2800 are rotatably or pivotally supported by the stationary brace 2450 and pivot or move between an open position 2420 of the pivoting support assembly 2400, corresponding to the expanded state 2920 of the plant cover 2000, and a closed position 2410 of the pivoting support assembly 2400, corresponding to the collapsed state 2910 of the plant cover 2000. Each of the pivoting rod supports 2802*a*, 2802*b*, 2802*c*, 2802*d* of the plurality of rod supports 2801 receives a first end 2220 of a respective rod of the plurality of rods 2210. Each rod of the plurality of rods 2210 extends along a seam (like the seam 330 of the first exemplary embodiment) of the canopy 2300 and a second end of the rod is received in a pocket (like the pocket 360 of the first exemplary embodiment) at the lower peripheral edge PE of the canopy 2300. Advantageously, the pivoting support assembly 2400 includes a latching mechanism 2880 which provides a plurality of latches 2882, one latch formed or defined on each rod support 2802 of the plurality of pivoting rod supports 2801 and a plurality of latch receivers 2488, one latch receiver 2488 formed on each projection 2471 of a plurality of radially extending projections 2470 of the brace 2450. The plurality of latches 2882 releasably engage respective ones of the plurality of latch receivers 2488 when the pivoting support assembly 2400 is in the open position 2420, each rod support 2802*a*, 2802*b*, 2802*c*, 2802*d* of the plurality of pivoting rod supports 2801 are secured or latched to the brace 2450 buy the latching mechanism 2880 to remain in the open position 2420 of the pivoting support assembly 2400 until the user releases each of the plurality of latches 2882 and folds or pivots each of the rod supports 2802*a*, 2802*b*, 2802*c*, 2802*d* of the plurality of pivoting rod supports 2801 downwardly and radially inwardly toward the plant cover central axis CA to move the pivoting support assembly 2400 to the closed position 2410.

Operation of Plant Cover 2000

Unlike the plant covers 100, 1000 of the first two exemplary embodiments, the plant cover 2000 does not include an actuation assembly to move or transform the plant cover 2000 between the expanded state 2920 (corresponding to the open position 2420 of the pivoting support assembly 2400) and the collapsed state 2910 (corresponding to the closed position 2420 of the pivoting support assembly 2400). Rather, when the plant cover 2000 is in the collapsed state 2910 and the user wishes to move or transform the plant cover 2000 to the expanded state 2920 for use of the plant cover 2000, the user will grasp a first pivoting rod support 2802*a* of the plurality of pivoting rod supports 2801 and pivot the support 2802*a* radially outwardly and upwardly, away from the plant cover central axis CA, until the latch 2882 of the rod support 2802*a* engages and locks into the corresponding latch receiver 2488 of a corresponding first projection 2471*a* of the brace 2450. An angled latch member 2890 extends transversely from an upper portion 2886 of a cantilevered wall 2884 of the latch 2882. Specifically, in one exemplary embodiment, the angled latch member 2890 comprises an angled distal projection 2892. The angled distal projection 2892 of the latch member 2890 engages a generally v-shaped indentation or recess 2490 defining the latch receiver 2488 of the first projection 2471*a* to latch the first rod support 2802*a* and the first projection 2471*a* together and secure the first rod support 2802*a* in the open position 2420. The outward pivoting and latching of the first rod support 2802*a* causes the respective rod, e.g., rod 2210*a*, of the plurality of rods 2210 which is secured to the first pivoting rod support 2802*a* to also move outwardly, away from the plant cover central axis CA such that the second end of the rod 2210*a* moves to an outwardly splayed position, that is, an open position 2840 of the rod support 2802*a*. Next, the user will grasp a second pivoting rod support 2802*a* of the plurality of pivoting rod supports 2801 and pivot the support 2802*b* radially outwardly and upwardly, away from the plant cover central axis CA, until the latch 2882 of the rod support 2802*b* engages and locks into the corresponding latch receiver 2488 of a corresponding second projection 2471*a* of the brace 2450. This causes the respective rod, e.g., rod 2210*b*, of the plurality of rods 2210 which is secured to the second pivoting rod support 2802*b* to also move outwardly, away from the plant cover central axis CA such that the second end of the rod 2210*b* moves to an outwardly splayed position, that is, an open position 2840 of the rod support 2802*b*. Assuming, in one exemplary embodiment, that the plant cover 2000 has four rod supports 2802*a*, 2802*b*, 2802*c*, 2802*d* in the plurality of pivoting rod supports 2801 and corresponding four rods 2210*a*, 2210*b*, 2210*c*, 2210*d* in the plurality of rods 2210, this same process is repeated for third and fourth pivoting rod supports 2802*c*, 2802*d*, that is, the sequential pivoting of the rod supports 2801 and corresponding sequential latching of latches 2882 and latch receivers 2488 is repeated for all four rod supports 2802*a*, 2802*b*, 2802*c*, 2802*d* of the plurality of pivoting rod supports 2801. When the latching is completed, all four rods supports 2802*a*, 2802*b*, 2802*c*, 2802*d* are in their open positions 2840 and, accordingly, the pivoting support assembly 2400 is in the open position 2420 and the plant cover is in the expanded state 2920.

Figure 31A:
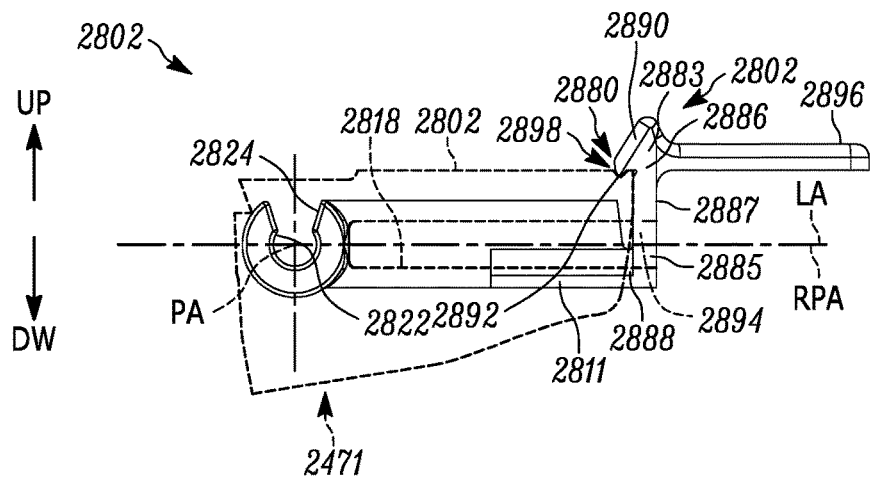
FIG. 31A is a schematic side elevation view of a pivoting rod support of the rod support assembly with a latch of a latching mechanism of the pivoting support assembly in a locked or latched condition.
Figure 31B:
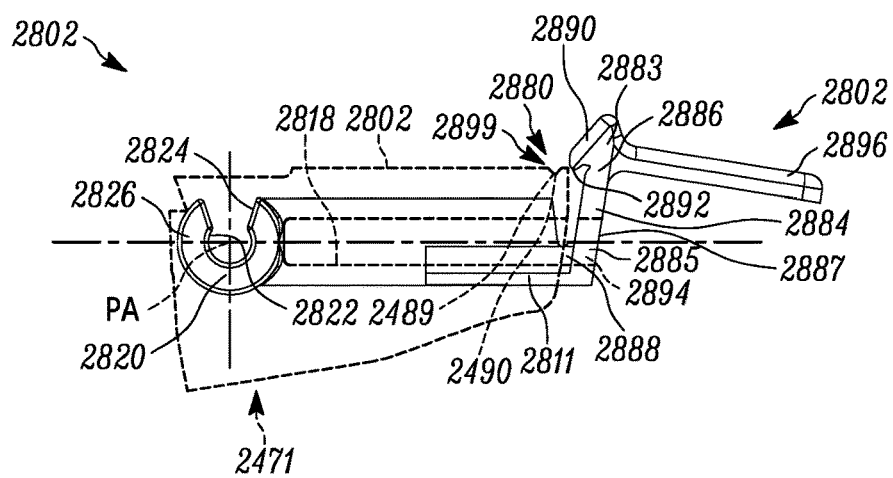
FIG. 31B is a schematic side elevation view of the pivoting rod support of FIG. 31A with the latch of a latching mechanism of the pivoting support assembly in a unlocked or release condition.
Figure 32:
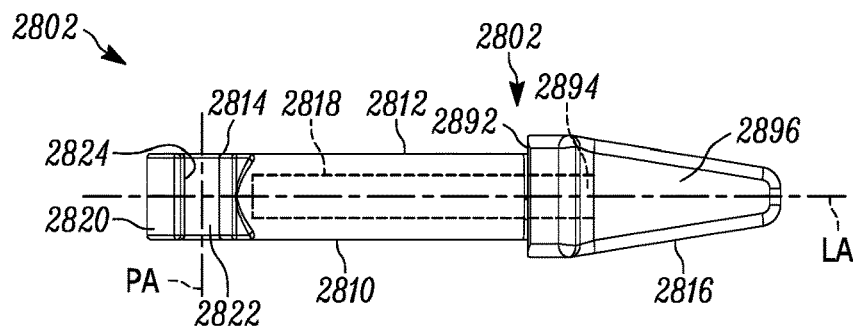
FIG. 32 is a schematic top plan view of the pivoting rod support of FIG. 31A.

Similarly, when the plant cover 2000 is in the expanded state 2920 and the user wishes to move or transform the plant cover 2000 to the collapsed state 2910 for storage or transport of the plant cover 2000, the user will grasp the first pivoting rod support 2802*a* of the plurality of pivoting rod supports 2801 and push on a release tab 2898 of the latch 2882 of the rod support 2802*a*. The release tab 2898 of the latch 2882 also extends transversely from an upper portion 2886 of the cantilevered wall 2884 of the latch 2882 in a direction opposite of the angled latch member 2890. As is schematically illustrated in FIG. 31B, pushing downwardly on the release tab 2898 causes a flexing or bending of the cantilevered wall 2884 such that the distal projection 2892 of the angled latch member 2890 lifts upwardly and away from the v-shaped indentation or recess 2490 of the latch receiver 2488 thereby disengaging the latch 2882 from the respective latch receiver 2488 of the first projection 2471*a*. The user then pivots the first pivoting rod support 2802*a* radially inwardly and downwardly, toward the plant cover central axis CA, such that the corresponding rod 2210 of the plurality of rods 2210 coupled to the first pivoting rod support 2802*a* moves to a position generally parallel to the plant cover central axis CA, that is, a closed position 2810 of the rod support 2802*a*.

Next, the user will grasp the second pivoting rod support 2802*b* of the plurality of pivoting rod supports 2801 and push downwardly on the release tab 2898 of the latch 2882 of the rod support 2802*b* thereby flexing or bending the cantilevered wall 2884 of the latch 2882 such that the angled latch member 2890 lifts upwardly and away from the v-shaped indentation or recess 2490 of the latch receiver 2488 thereby disengaging the latch 2882 from the respective latch receiver 2488 of the second projection 2471*a*. The user then pivots the second pivoting rod support 2802*b* downwardly and radially inwardly toward the plant cover central axis CA such that the corresponding rod 2210 of the plurality of rods 2210 coupled to the second pivoting rod support 2802*b* moves to a position generally parallel to the plant cover central axis CA, as shown in FIG. 22. Assuming, in one exemplary embodiment, that the plant cover 2000 has four rod supports 2802*a*, 2802*b*, 2802*c*, 2802*d* in the plurality of pivoting rod supports 2801 and corresponding four rods 2210*a*, 2210*b*, 2210*c*, 2210*d* in the plurality of rods 2210, this same process is repeated for third and fourth pivoting rod supports 2802*c*, 2802*d* of the plurality of rod supports 2801. That is, the sequential unlatching or disengaging of latches 2882 and latch receivers 2488 and pivoting the rod supports 2802 downwardly and radially inwardly toward the plant cover central axis CA is repeated for each rod support 2802*a*, 2802*b*, 2802*c*, 2802*d* of the plurality of pivoting rod supports 2801. When this sequential process is completed, all four rods supports 2802*a*, 2802*b*, 2802*c*, 2802*d* are in their closed positions 2830 and, accordingly, the pivoting support assembly 2400 is in the closed position 2420 and the plant cover is in the collapsed state 2920. As the plurality pivoting rod supports 2801 are not latched in their respective closed positions 2830, to maintain the plant cover 2000 in the collapsed state 2910 and the cylindrical configuration 2912, shown in FIG. 22, optionally, a circumferential wrap or tie bands 2380 (FIGS. 21 and 22) may be attached to an outer surface of the canopy 2300 or sewn into a seam of the canopy 2300, as shown in FIG. 21, between an axial midpoint of the plant cover 2000 and the lower end 2002 of the plant cover 2000. The tie bands could be loop in opposite directions around the outer surface of the canopy 2300 and then fastened or tied together to maintain the cylindrical configuration 2912 of the plant cover 2000 when the plant cover 2000 is in the collapsed state 2910. This cylindrical configuration 2912, as previously mentioned, facilitates storage and shipment of the plant cover 2000 by minimizing the volume and footprint of the cover during shipping, inventory and/or storage.

Brace 2450

Figure 33:
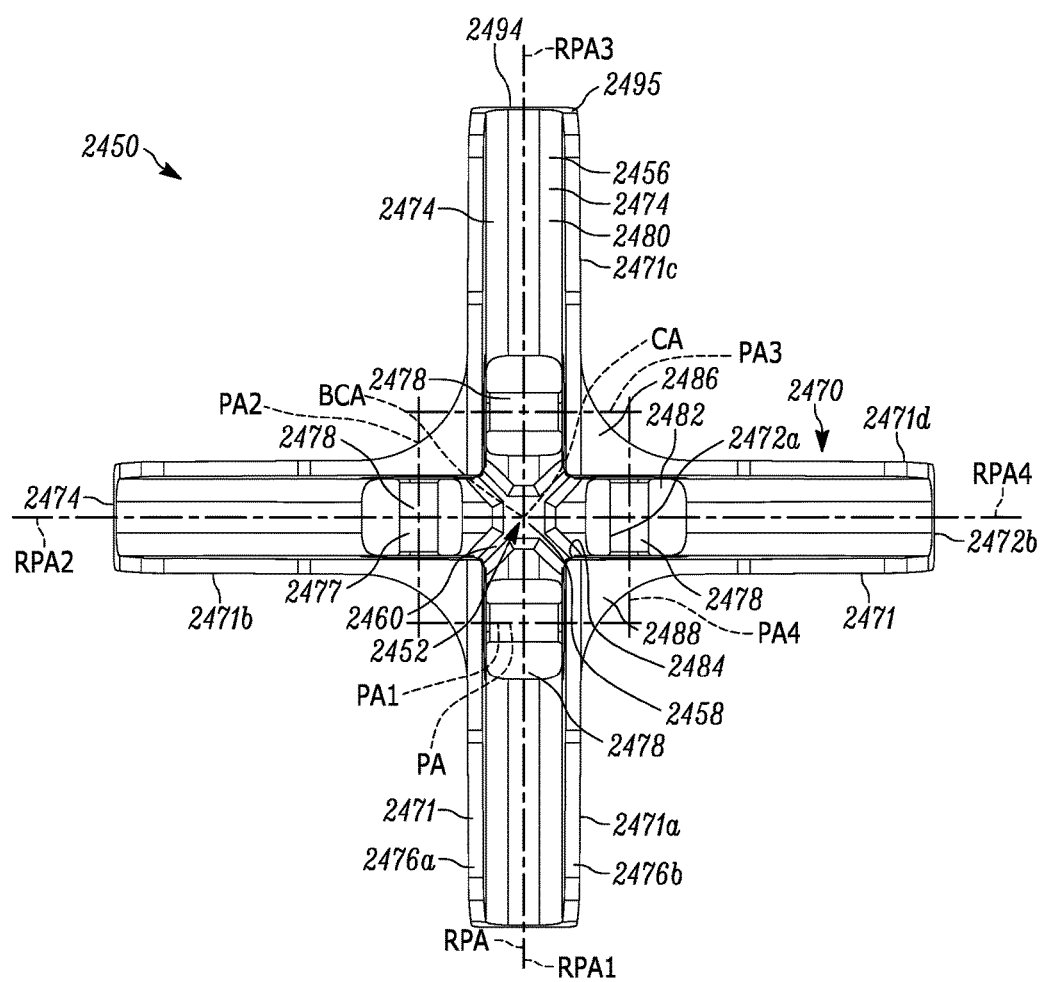
FIG. 33 is a schematic top plan view of the brace of the pivoting support assembly of FIG. 23.

The brace 2450 includes a central base 2452 which extends along the central longitudinal axis CA of the plant cover 2000 and the plurality of projections 2470, each projection 2471 of the plurality of projections 2470 extends or projects generally radially outwardly from the central base 2452 and each projection 2471 of the plurality of projections 2470 are uniformly circumferentially spaced apart about the base 2452. In one exemplary embodiment, as best seen in FIG. 33, the brace 2450, when viewed in top plan view, is a generally x-shaped brace, having four radially extending projections 2470*a*, 2470*b*, 2470*c*, 2470*d*, spaced substantially uniformly circumferentially 90° apart, each projection pivotally receiving and supporting a respective one of four rod supports 2802*a*, 2802*b*, 2802*c*, 2802*d* of the plurality of rod supports 2802 of the rod support assembly 2800. It should be appreciated, however, that it is within the scope of the present disclosure to have more or less than four projections 2470 and a corresponding number of rod supports 2802, depending on the desired size, shape, load bearing requirements of the plant cover 2000.

Figure 28:
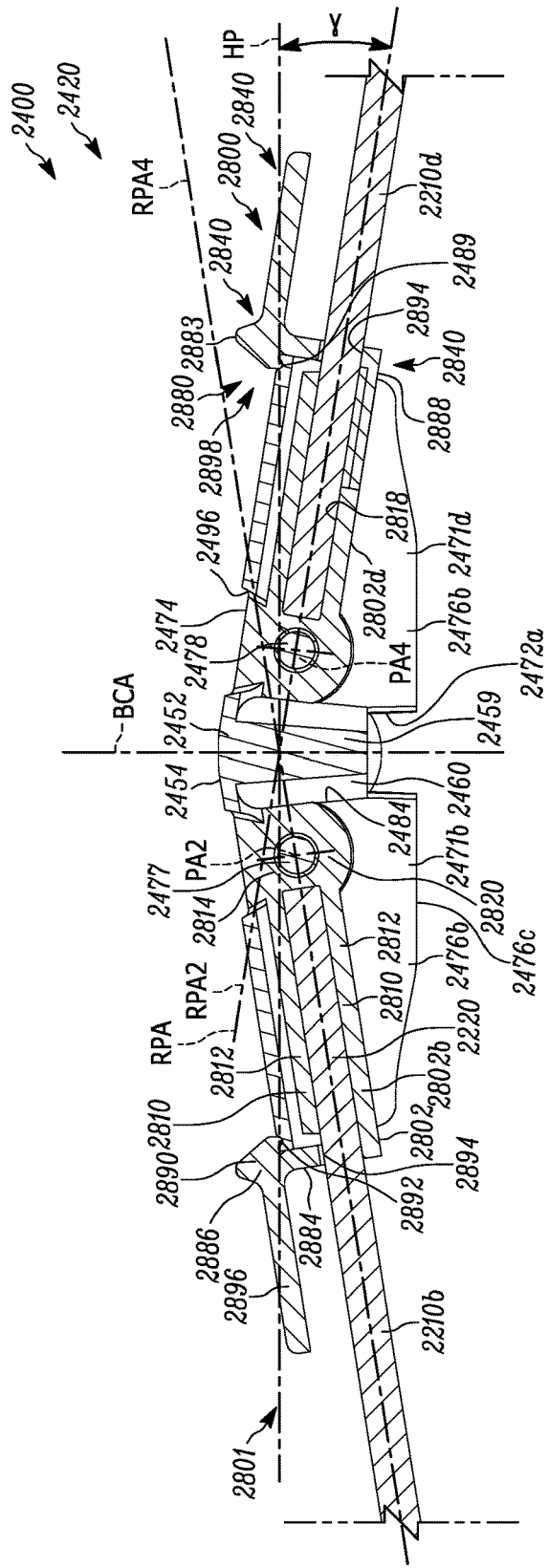
FIG. 28 is a schematic longitudinal section view of the pivoting support assembly of FIG. 23 in the open position, as seen from a plane indicated by the line 28-28 in FIG. 26.

The central base 2452 of the brace 2450 extends axially, that is vertically, along a central axis BCA of the brace 2450. The brace central axis BCA is substantially coincident with the plant cover longitudinal central axis CA. Each projection 2471 of the plurality of projections 2470 of the brace 2450 extend along respective radial projection axes RPA1, RPA2, RPA3, RPA4 (collectively RPA) that intersect at the central longitudinal axis CA of the plant cover 2000 and the central axis BCA of the brace 2450. As best seen in FIG. 28, the projection 2471 and its corresponding radial projection axis RPA is angled slightly downwardly at an angle α with respect to a horizontal plane HP that is orthogonal to the plant cover and brace central axes CA, BCA. In one exemplary embodiment, the angle α is approximately 8.8°. The reason for the slight downward angle α of the plurality projections 2470 is that, when the plant cover 2000 is in the expanded state 2920, the shape of the canopy 2300, when viewed in longitudinal section, is umbrella or u-shaped. Thus, the rods of the plurality of rods 2210, having an approximate diameter of 5 mm. in one exemplary embodiment, are flexed into an arcuate shape in the expanded state 2920 of the plant cover 2000. It would not be desirable to have the projections axes RPA extending horizontally or orthogonally to the plant cover central axis CA given the u-shaped configuration of the canopy, as this would require the plurality of rods 2210 to be under a high flex/bending load. The small downward angle α mitigates the flex/bending load imposed on the plurality of rods.

For brevity, only one representative projection, designated as projection 2471, of the plurality of projections 2470 of the brace 2450, will be described in detail, it being understood that the description of projection 2471 equally applies to each of the four projections 2471a, 2471b, 2471c, 2471d. Similarly, one representative pivoting rod support 2802, of the plurality of pivoting rod supports 2801 of the rod support assembly 2800, will be described in detail, it being understood that the description of pivoting rod support 2802 equally applied to the four pivoting rod supports 2802a, 2802b, 2802c, 2802d. Similarly, only one representative latch 2883 of the plurality of latches 2882 and one representative latch receiver 2489 of the plurality of latch receivers 2488 of the latching mechanism 2880 will be described in detail, it being understood that the descriptions of the representative latch 2883 and representative latch receiver 2489 apply equally to all four latches 2882 of the plurality of pivoting rod supports 2801 and all four latch receivers 2488 of the plurality of projections 2470.

The projection 2471 includes a top or upper wall 2474 bridging a pair of spaced apart, substantially parallel side walls 2476a, 2476b. An inner surface 2479 of the projection 2471, including the upper and side walls 2474, 2476a, 2476c, define a generally inverted u-shaped opening or socket 2480. In the open position 2420 of the pivoting support assembly 2400, each of the sockets 2480 snugly receives a generally cylindrical central body portion 2810 of a respective rod support 2802 of the plurality of pivoting rod supports 2801. In the open position 2420, the cylindrical central body portion 2810 of the rod support 2801 is in contact with the first and second side walls 2476a, 2476b of the projection 2471. As can best be see, for example in FIG. 28, in the open position 2420, the cylindrical body portion 2810 is slightly spaced from the upper wall 2474 because of the slight overtravel requirement for the latch member 2890 to pass the full extent of the upper peripheral edge 2494 of the upper wall 2474 and then be seated in the latch receiver 2489. Each projection 2471 includes a proximal end 2472a, adjacent the central base 2452, and a distal end 2472b, spaced radially outwardly from the central base 2452. Adjacent the distal end 2472b of the projection 2471 is a latch receiver 2489 of the plurality of latch receivers 2488, which is part of the latching mechanism 2880 of the pivoting support assembly 2400.

Figure 25:
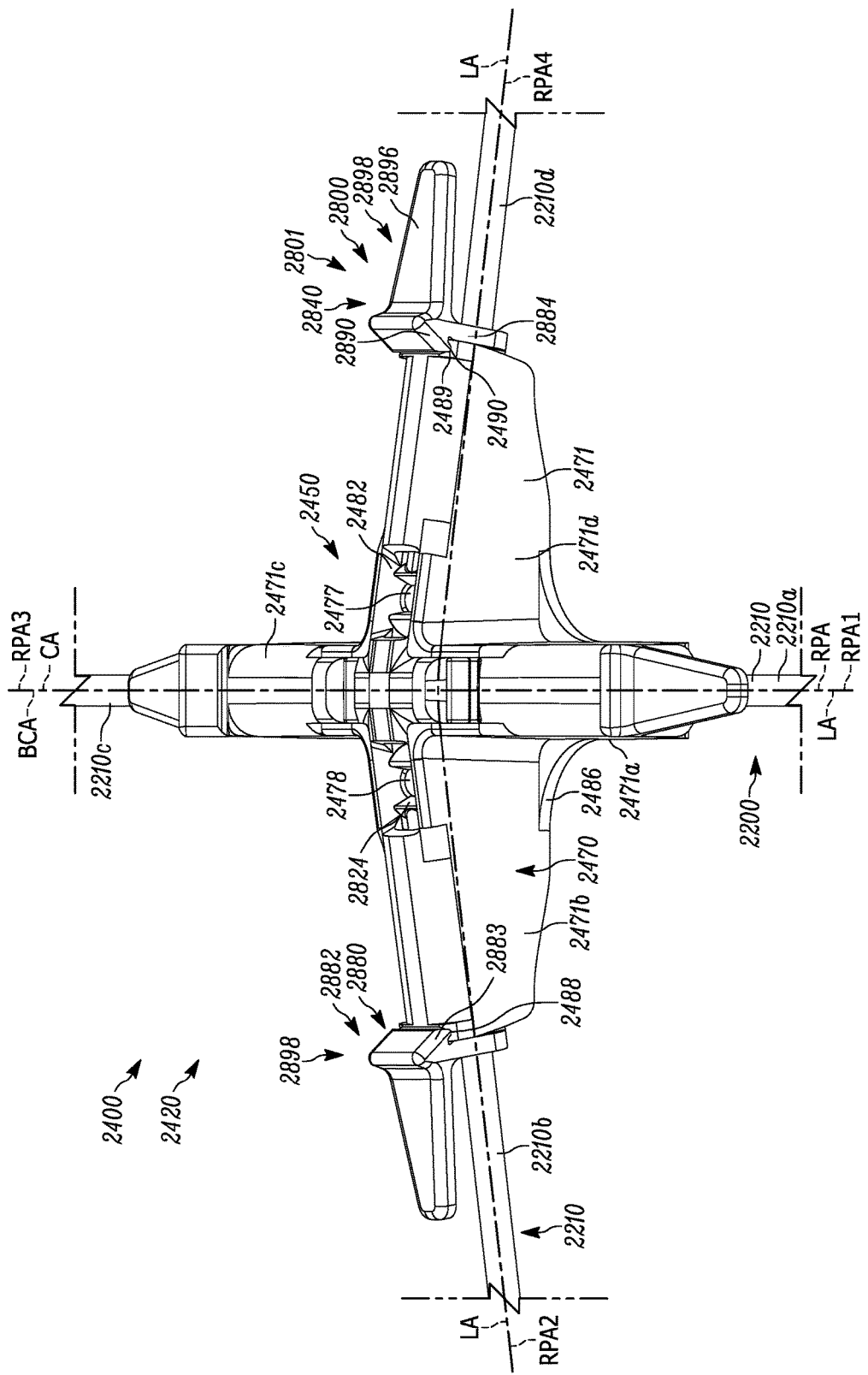
FIG. 25 is a schematic top perspective view of the pivoting support assembly of FIG. 23 with the pivoting support assembly in the open position.
Figure 26:
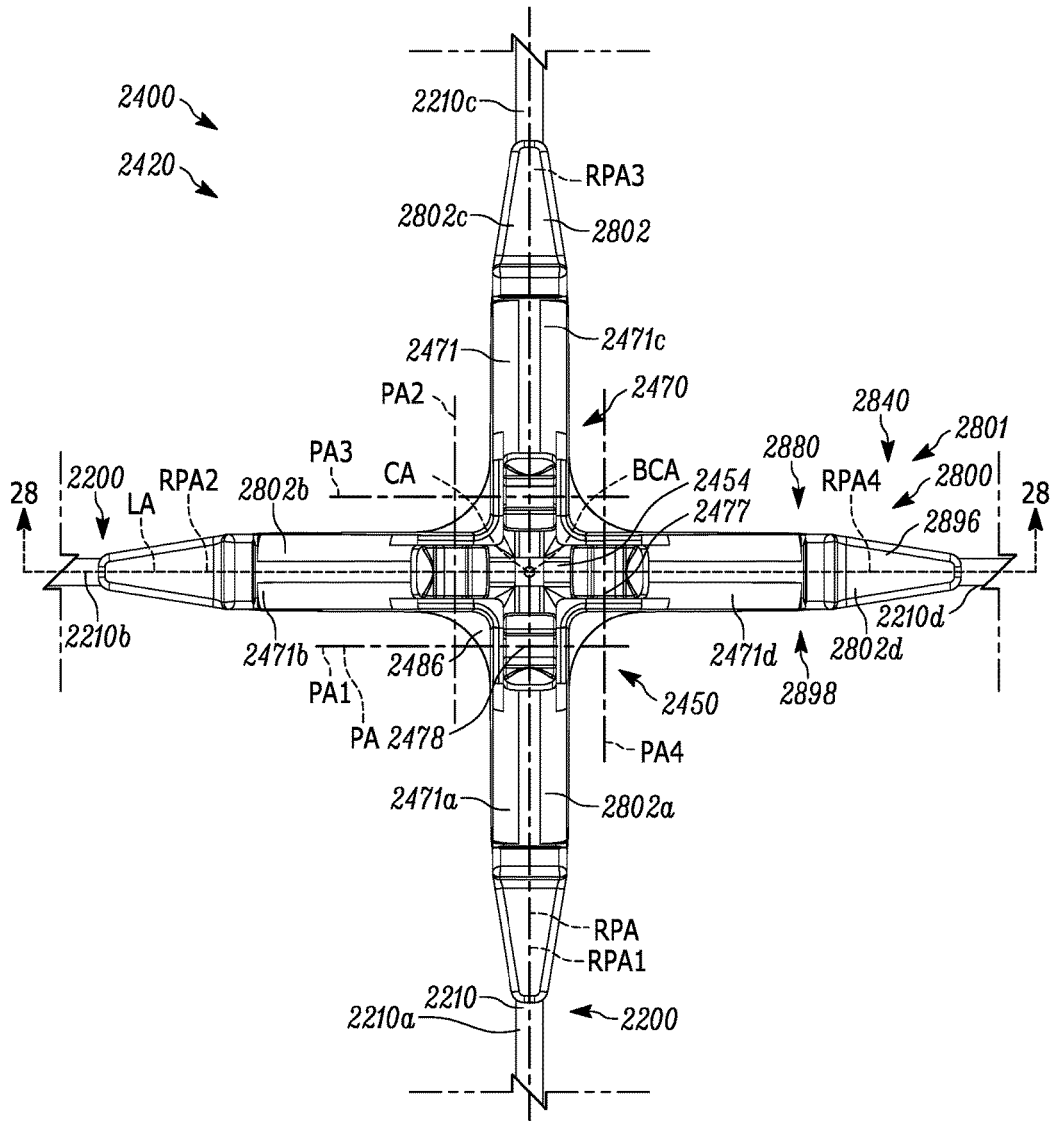
FIG. 26 is a schematic top plan view of the pivoting support assembly of FIG. 23 in the open position.
Figure 27:
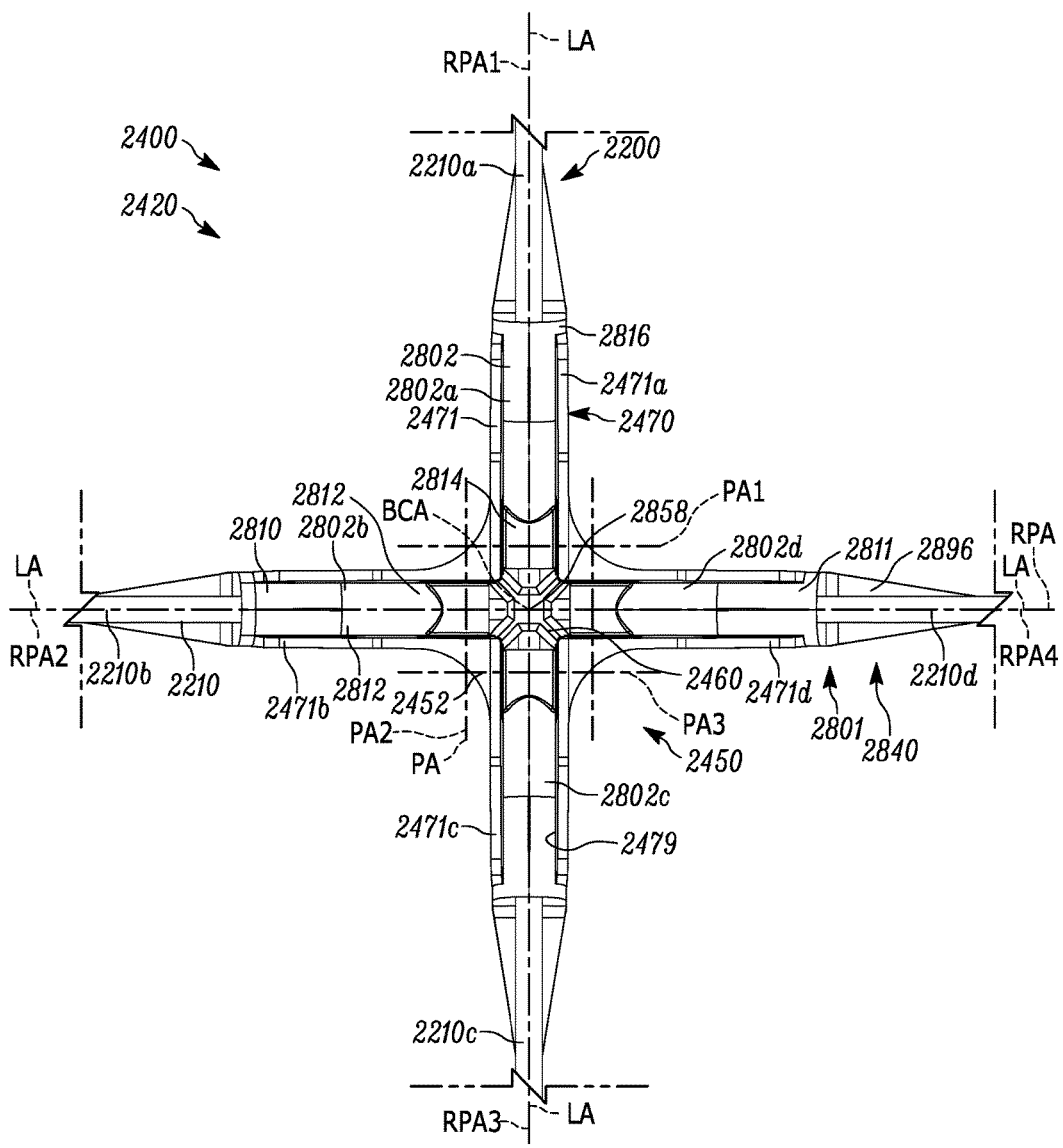
FIG. 27 is a schematic bottom plan view of the pivoting support assembly of FIG. 23 in the open position.
Figure 29:
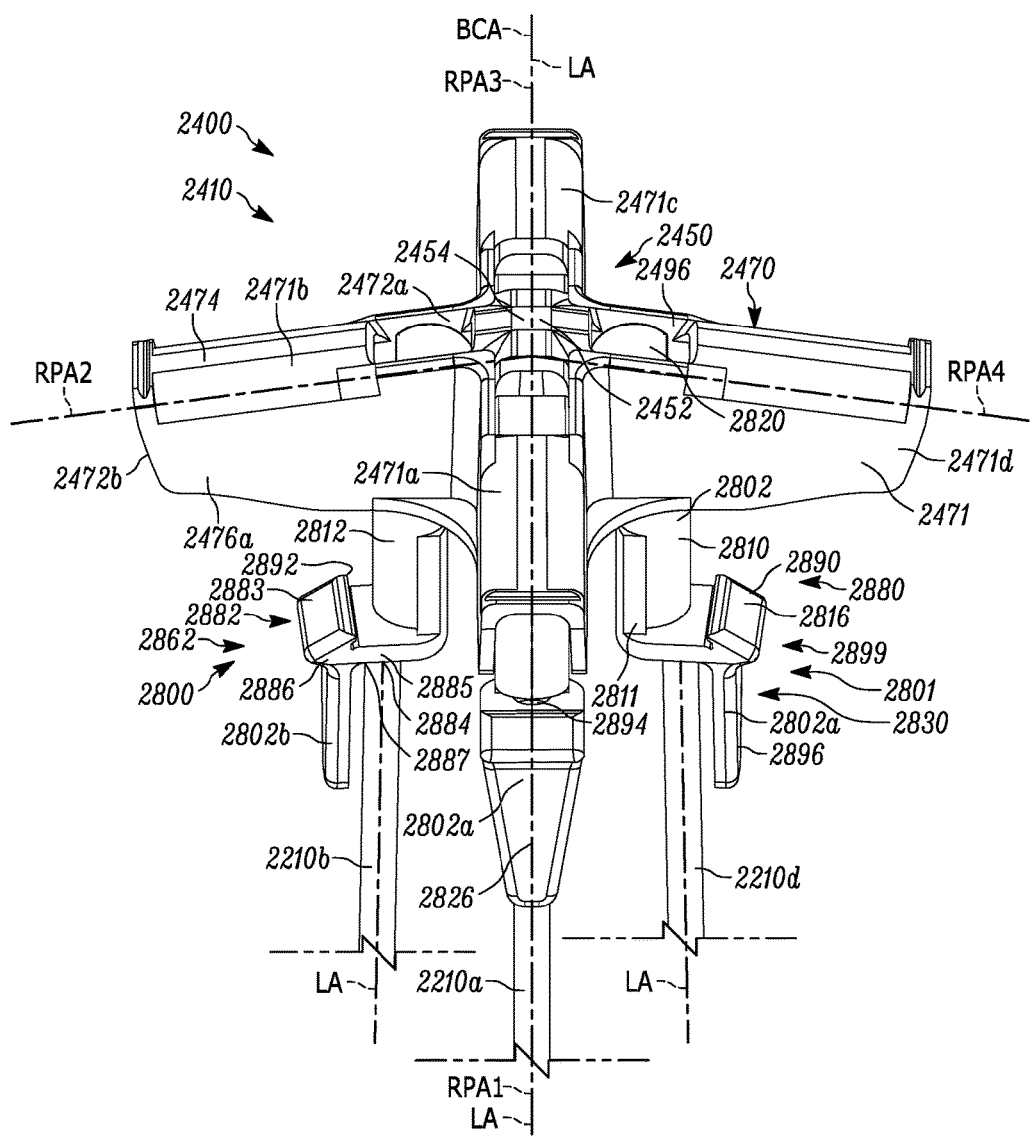
FIG. 29 is a schematic top perspective view of the pivoting support assembly of FIG. 23 in a closed position.
Figure 30:
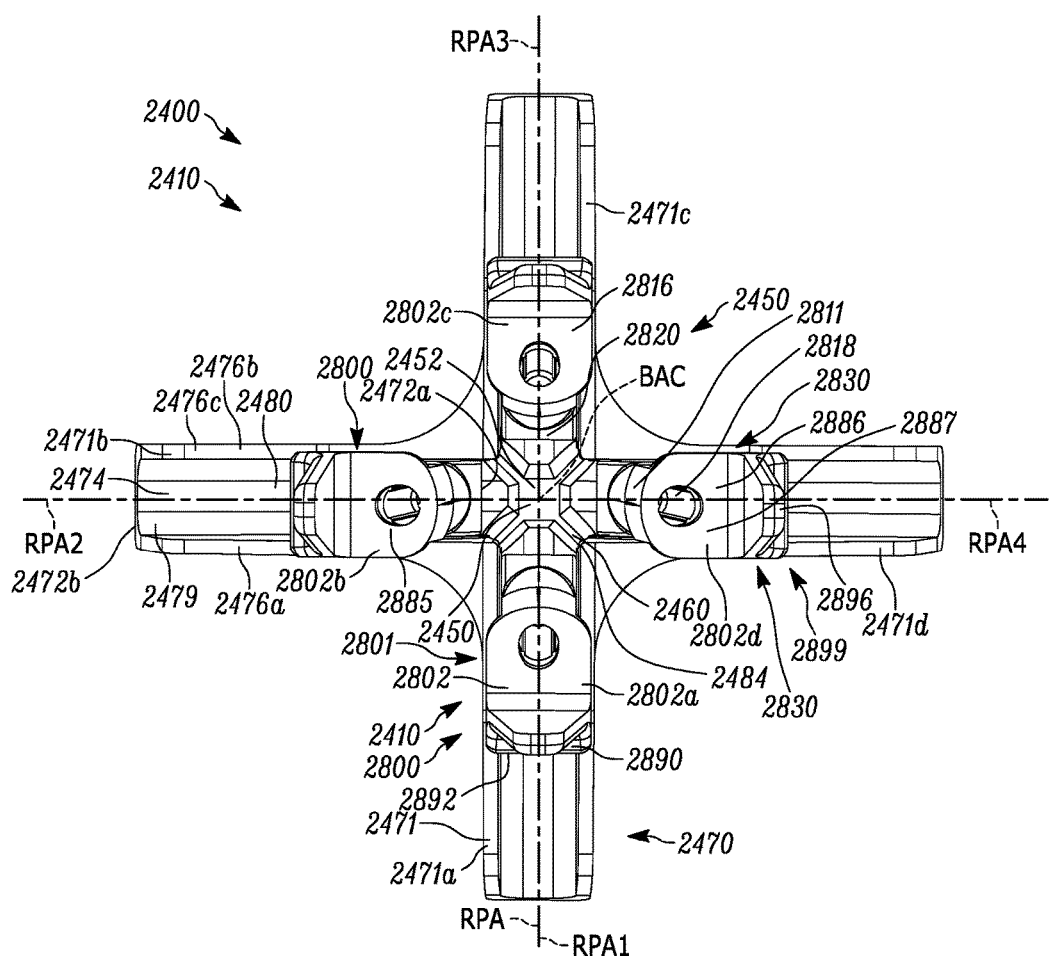
FIG. 30 is a schematic bottom plan view of the pivoting support assembly of FIG. 23 in the closed position.

In one exemplary embodiment, the latch receiver 2489 comprises the v-shaped indentation or recess 2490 formed in an upper surface 2492 of the upper wall 2472 of the projection 2471 of the brace 2450. The v-shaped indentation or recess 2490 is spaced just inward of an outer peripheral edge 2494 of the upper wall 2472 of the projection 2471 and, in the open position 2420 of the pivoting support assembly 2400, the v-shaped indentation 2490 is releasably engaged by the angled latch member 2890 of the latch 2883 of the pivoting rod support 2802 of the plurality of the pivoting rod supports 2801 to maintain the pivoting rod support 2802 in an open position 2840 of the rod support 2802 wherein the cylindrical central body portion 2810 of the rod support 2802 is received in the socket 2480 of the projection 2471. When all four rod supports 2802a, 2802b, 2802c, 2802d of the plurality of rod supports 2801 are in the open position 2840, the pivoting support assembly 2400 is in the open position 2420 (FIG. 25). Similarly, when all four rod supports 2802a, 2802b, 2802c, 2802d of the plurality of rod supports 2801 are in a closed position 2830, the pivoting support assembly 2400 is in the closed position 2410 (FIG. 29).

The projection 2471 of the plurality of projections 2470 includes a pivot support 2477 that defines a pivot axis PA for the pivoting rod support 2802 of the plurality of rod supports 2801. As in one exemplary embodiment, there are four projections 2471a, 2471b, 2471c, 2471d, accordingly there are four pivot axes PA1, PA2, PA3, PA4 about with the four rod supports 2802a, 2802b, 2802c, 2802d respectively pivot. The four pivot axes PA1, PA2, PA3, PA4 are at the same axial height and, being substantially orthogonal to each other, adjacent pairs of pivot axes, e.g., PA2 and PA2, intersect each other. The pivot axes PA1, PA2, PA3, PA4 are radially spaced from the plant cover central longitudinal axis CA. When viewed in plan view from above the plant cover 2000, the four pivot axes PA1, PA2, PA3, PA4 can be viewed as forming a square which has as its center point the plant cover central axis CA. Thus, the four pivot axes PA1, PA 2, PA3, PA4, taken together, are centered about the cover central axis CA.

In one exemplary embodiment, the pivot support 2477 is a cylindrical axle 2478 which extends along the pivot axis PA between the side walls 2476a, 2476b of the projection 2471. The cylindrical axle 2478 forms a stationary bearing. A proximal portion 2814 of the pivoting rod support 2802 includes a split collar 2820 that is rotatably received on the cylindrical axle 2478 of the projection 2471 to support the rod support 2802 for rotation about the pivot axis PA between the open and closed positions 2840, 2830 of the rod support 2802. An inner surface 2822 of the split collar 2820 functions as a rotational bearing surface rotating on the stationary bearing of the cylindrical axle 2478. The collar 2820 includes a circumferential split 2824 to allow for assembly of the collar 2820 to the axle 2478 in a snap-fit type rotational engagement. The radial projection axis RPA of the projection 2471 extends from the brace central axis BCA and is substantially parallel to the upper wall 2474 and the side walls 2476a, 2476b of the projection 2471 and passes through the cylindrical axle 2478 and intersects the pivot axis PA of the projection 2471. When the pivoting rod support 2802 is in the closed position 2830, a longitudinal axis LA of the rod support 2802 is substantially aligned with and coincident with the radial projection axis RPA of the projection 2471. Thus, the longitudinal axis LA of the rod support 2802 also intersects the pivot axis PA defined by the cylindrical axle 2478 of the projection 2471. Adjacent the proximal end 2472a of the projection 2471 is a clearance cut out 2496 in the upper wall 2474 of the projection 2471. The clearance cut out 2496 provides for clearance of an outer surface of the split collar 2820 of the proximal portion 2814 of the rod support 2802.

In one exemplary embodiment, the central base 2452 of the brace 2450, when viewed in top plan view from above the plant cover 2000, includes a generally square-shaped upper wall 2454. Extending axially downwardly from an inner or lower surface 2456 of the upper wall 2454 is a pedestal 2858 which extends along the central axis BCA of the brace 2450 and along the central axis CA of the plant cover 2000. Four vertically or axially extending interior corners 2484 are formed at the proximal ends 2472a of orthogonally intersecting side walls 2476a, 2476b of adjacent projections 2471a, 2471b, 2471c, 2471d. The four interior corners 2484 extend parallel to the pedestal 2858 of the central base 2552. Four support ribs 2460 extend radially between the four interior corners 2484 of the plurality of projections 2470 and the pedestal 2858. Advantageously, the four support ribs 2460 provide the brace 2450 with greater rigidity and strength so that the brace 2450, including the plurality of projections 2470, will not experience undue or excessive flexing or bending when the latches 2883 of the plurality of latches 2882 of the latching mechanism 2880 are moved between a latched condition 2898 (FIG. 31A) and an unlatched condition 2899 (FIG. 31B) and when the pivoting rod supports 2802a, 2802b, 2802c, 2802d of the plurality of rod supports 2801 are moved between the open position 2840 and the closed position 2830. Additionally and advantageously, four arcuate support webs 2486 extend between lower edges 2476c of side walls 2476a, 2476b of adjacent projections of the plurality of projections 2470 to provide the brace 2450 with even greater rigidity and strength so that the brace 2450, including the plurality of projections 2470, will not experience undue or excessive flexing or bending when the latches 2883 of the plurality of latches 2882 of the latching mechanism 2880 are moved between a latched condition 2898 (FIG. 31A) and an unlatched condition 2899 (FIG. 31B) and when the pivoting rod supports 2802a, 2802b, 2802c, 2802d of the plurality of rod supports 2801 are moved between the open position 2840 and the closed position 2830 or when forces, such as wind loads, snow loads and the like are applied to the plant cover 2000 when the plant cover 2000 is in the expanded state 2920 and is in use in an outdoor setting.

Latching Mechanism 2880

The latching mechanism 2880 includes the plurality of latches 2882 formed on respective different ones of the plurality of pivoting rod supports 2801 of the rod support assembly 2800 and the plurality of latch receivers 2488 of respective different ones of the plurality of radially extending projections 2470 of the brace 2450. As explained above, in the open position 2420 of the pivoting support assembly 2400, each rod support 2802 of the plurality of pivoting rod supports 2801 is secured or latched to a respective one of the plurality of projections 2470 of the brace 2450 by the plurality of latches 2882 of the latching mechanism 2880 so that the pivoting support assembly 2400 remains in the open position 2420 until the user releases each of the plurality of latches 2882. When the pivoting support assembly 2400 is in the open position 2420, the plurality of latches 2882 are in the latched condition 2898 and securely and rigidly maintain the pivoting support assembly 2400 in the open position 2420 and the plant cover 2000 in the expanded state 2920. Thus, the latching mechanism 2880 advantageously prevents undesired collapse or moving of the plant cover 2000 to the collapsed state 2910 due to forces applied to the plant cover 2000 resulting from, for example, wind loads, snow loads, and the like when the plant cover 2000 is in use. It is essential that the plant cover 2000, once transformed by the user into the open position 2420 of the pivoting support assembly 2400, remain in the open position 2420 until changed again by the user. Otherwise, the plants, shrubs, vegetation being protected by the plant cover 2000 could be inadvertently damaged or destroyed if the cover 2000 were to collapse from wind or snow loads.

To move or transform the plurality of latches 2882 to the unlatched condition 2899 such that the plant cover 2000 moves to the collapsed state 2910, it is necessary that each of the plurality of latches 2882 must be moved from the latched condition 2898 to the unlatched condition 2899. To allow for the release of the angled latch member 2892 of the latch 2883 of the rod support 2802 from the v-shaped indentation or recess 2490 forming the latch receiver 2489 of the projection 2471, the latching mechanism 2880 provides for the latch 2883 to include a release tab 2898 to effectuate release and disengagement of the latch 2883 from the latch receiver 2489 such that that rod support 2802 may be pivoted downwardly to the closed position 2830. In one exemplary embodiment, the latch 2883 is formed at a distal portion 2816 of the pivoting rod support 2802 and comprises the axially extending cantilevered wall 2884. The vertically extending cantilevered wall 2884 is connected to the cylindrical central body portion 2810 of the rod support 2802 by a generally horizontally extending bridge wall 2888 that extends between a lower, reinforced distal end portion 2811 of the central body portion 2810 of the rod support 2802 and a lower portion 2885 of the cantilevered all 2884. Advantageously, the connection structured afforded by the bridge wall 2888 allows the cantilevered wall 2884 to flex or bend with respect to the bridge wall 2888 and therefore to flex or bend with respect to the central body portion 2810. The angled latch member 2890 extends transversely from an upper portion 2886 of a cantilevered wall 2884 of the latch 2883 and the release tab 2898 extends from an outward facing surface 2887 of the cantilevered wall in the upper portion 2886 of the cantilevered wall 2884. The angled latch member 2890 and the v-shaped recess 2490, when viewed in top plan view, have an extent that is generally parallel to the pivot axis PA of rod support 2802 as defined by the cylindrical axle 2478 bridging the side walls 2476a, 2476b of the projection 2471.

The user pressing downwardly on the release tab 2898 of the latch 2883 causes the cantilevered wall 2884 to flex outwardly about the bridge wall 2888 such that the upper portion 2886 of the cantilevered wall 2884 moves outwardly or away from the distal end 2472b of the projection 2471, as seen for example in FIG. 31B. This flexing action of the cantilevered wall 2884 causes an upward and outward movement of the distal projection 2892 of the angled latch member 2892 of the latch 2883 of the rod support 2802 from the v-shaped indentation or recess 2490 forming the latch receiver 2489 of the projection 2471 thereby releasing the angled latch member 2892 of the latch 2883 from the v-shaped recess 2490. Stated another way, pressing on the release tab 2898 and resulting flexing of the cantilevered wall 2884 results in the unlatching of the angled latch member 2898 from the v-shaped recess 2490 and thereby causes the latch 2883 to move from the latched condition 2898 to the unlatched condition 2899 and allows the user to move or pivot the pivoting rod support 2802 to be moved or pivoted from the open position 2840 to the closed position 2830 of the rod support 2802.

When moving or pivoting the pivoting rod support 2802 from the closed position 2830 to the open position 2840, advantageously, as the rod support 2802 is pivoted upwardly and nears the end of its path of travel, the distal projection 2892 of the angled latch member 2890 of the latch 2883 engages and slides upwardly along outer peripheral edges 2495 of the pair of side walls 2476a, 2476b of the projection 2471 and continues to slide upwardly along the outer peripheral edge 2494 of the upper wall 2474 of the projection 2471. When the distal projection 2892 of the angled latch member 2890 clears the outer peripheral edge 2494 of the upper wall 2474 of the projection 2471, the distal projection 2892 of the angled latch member 2890 snaps into the v-shaped recess 2490 in the upper surface 2492 of the upper wall 2474 to achieve the latched condition 2898. That is, the latch member 2890 is received in the v-shaped indentation or recess 2490 of the latch receiver 2489 of the projection 2471, thereby securing the pivoting rod support 2802 in the open position 2840 by a latched, snap-fit type engagement of the latch member 2883 and the latch receiver 2489 of the latching mechanism 2880. Again and advantageously, the flexing action of the cantilevered wall 2884 allows the latch member 2890 to ride along the outer peripheral edge of the projection 2471 and then, when the peripheral edge is cleared, to snap into engagement with the v-shaped recess 2490 of the latch receiver 2489 to obtain the secure and stable latching engagement between the projection 2471 of the brace 2450 and the pivoting rod support 2802. When in the latched condition 2898, the cylindrical body portion 2810 of the rod support 2802 is received within or nested in the inverted u-shaped opening or socket 2480 defined by the inner surface 2479 of the projection 2471.

The cantilevered wall 2884 includes a circular opening 2894 through the lower portion 2885 of the wall 2884. The circular opening 2894 is radially aligned with a cylindrical shaped opening 2818 of a cylindrical body 2812 of the central body portion 2810 of the pivoting rod support 2802 such that the first end portion 2220 of a respective rod of the plurality of rods 2210 of the frame assembly 2200 can pass through the circular opening 2894 and be received in the cylindrical shaped opening 2818 of the cylindrical body 2813.

Rod Support Assembly 2800

The rod support assembly 2800 is pivotally coupled to the stationary brace 2450 and comprising the movable or pivoting portion of the pivoting support assembly 2400. The rod support assembly 2800 includes the plurality of pivoting rod supports 2801 that move or pivot between the open and closed positions 2840, 2830, corresponding to the open and closed positions 2420, 2410, respectively, of the pivoting support assembly 2400. In one exemplary embodiment, the plurality of pivoting rod supports 2801 include four rod supports 2802a, 2802b, 2802c, 2802d.

Turning to the representative pivoting rod support 2802, the support 2802 pivots about the pivot axis PA between the open and closed positions 2420, 2410 and includes the longitudinally extending generally cylindrical central body portion 2810. The cylindrical central body portion 2810 spaces apart or separates the proximal portion 2814 and the distal portion 2816 of the rod support 2802. The cylindrical central body portion 2810 comprises the cylindrical body 2818 and the lower reinforced distal end portion 2811. The cylindrical body 2818 defines the blind hole cylindrical opening 2818 receiving the first end portion 2220 of a respective rod of the plurality of rods 2210 of the frame assembly 2200. The lower reinforced distal portion 2811 of the central body portion 2810 provides a boss or support platform for the horizontally extending bridge wall 2888 that couples the cantilevered wall 2884 to the central body portion 2810 of the rod support 2802. A longitudinal axis LA of the pivoting rod support 2802 extends through a center of and is concentric with the cylindrical opening 2818 of the cylindrical body 2818 of the central body portion 2810. When the rod support 2802 is in the open position 2840, the radial projection axis RPA of the projection 2471 is substantially parallel to and aligned with or coincident with the longitudinal axis LA of the rod support 2802. In the open position 2840 of the pivoting rod support 2802, the longitudinal axis LA of the pivoting rod support 2802 intersects the brace central axis BCA and the plant cover central axis CA. In the closed position of the pivoting rod support 2802, the longitudinal axis LA is transverse to the radial projection axis RPA of the projection 2471 and is substantially parallel to the brace central axis BCA and the plant cover central axis CA.

The proximal portion 2814 of the pivoting rod support 2802 comprises the split collar 2802, as previously described. The split collar 2802 is rotatably mounted on the cylindrical axle 2478 of the pivot support 2477 of the projection 2471. The distal portion 2816 of the pivoting rod support 2802 comprised the latch 2883, as previously described. The latch 2883 includes the bridge wall 2818 that extends generally horizontally from the lower reinforced distal portion 2811 of the central body portion 2810 of the rod support 2802 and the cantilevered wall 2884 that extends upwardly or orthogonally from the bridge wall 2888. The lower portion 2885 of the cantilevered wall 2884 is connected to the bridge wall 2888 and includes the circular opening 2894 extending radially through the cantilevered wall 2884. The circular opening 2894 permits the first end portion 2220 of a respective rod of the plurality of rods 2210 to pass through and be received in the blind hole cylindrical opening 2818 of the cylindrical body 2812 of the central body portion 2810 of the rod support 2802. The upper portion 2886 of the cantilevered wall 2884 includes the angled latch member 2890 extending generally toward the cylindrical central body portion 2810 and the release tab 2898 extending generally away from the cylindrical central body portion 2810. Advantageously, the release tab 2898 is sufficiently long in radial extent such that firm user finger pressure on the release tab 2898 result in sufficient torque to flex the cantilevered wall 2884 and cause the angled latch member 2890 to disengage the v-shaped indentation or recess 2490 of the latch receiver 2489, that is, to allow the latching mechanism 2880 to move to the unlatched condition 2899.

As used herein, terms of orientation and/or direction such as upward, downward, forward, rearward, upper, lower, inward, outward, inwardly, outwardly, horizontal, horizontally, vertical, vertically, distal, proximal, axially, radially, etc., are provided for convenience purposes and relate generally to the orientation shown the Figures and/or discussed in the Detailed Description. Such orientation/direction terms are not intended to limit the scope of the present disclosure, this application and the invention or inventions described therein, or the claims appended hereto.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A plant cover extending along a central axis and selectively transformable between a collapsed state and an expanded state, the plant cover comprising:
   a) a frame including a plurality of rods, each of the plurality of rods including a first end and a second end, in the expanded state of the plant cover, a second end of each rod of the plurality of rods being a greater radial distance from the central axis of the plant cover than in the collapsed state of the plant cover;
   b) a foldable canopy secured to the plurality of flexible rods; and
   c) a pivoting support assembly operatively coupled to the frame, the pivoting support assembly including:
      i) a brace having a central base and a plurality of projections circumferentially spaced apart and extending radially outwardly from the central base, each projection of the plurality of projections extending along a radial projection axis and including an upper wall and first and second spaced apart side walls extending from the upper wall, a proximal end adjacent the central base and a distal end radially spaced from the proximal end, the upper wall and the first and second side walls defining a longitudinally extending socket extending along the radial projection axis of the projection, a pivot support defining a pivot axis, and a latch receiver; and
      ii) a plurality of rod supports, each rod support of the plurality of rod supports pivotally coupled to a respective corresponding projection of the plurality of projections of the brace and including a proximal portion and a distal portion spaced apart by a body portion extending longitudinally along a rod support longitudinal axis and including an opening receiving a first end of a respective corresponding flexible rod of the plurality of flexible rods, the proximal portion of the rod support including a collar pivotally mounted to the pivot support of the respective corresponding projection of the plurality of projections and the distal portion of the rod support including a latch, the rod support pivoting between an open position and a closed position, in the open position, the body portion being received in the socket of the respective corresponding projection and the latch engaging the latch receiver of the respective corresponding projection and, in the closed position, the latch disengaged from the latch receiver of the respective corresponding projection and the body portion extending transverse to the radial projection axis of the respective corresponding projection.

2. The plant cover of claim 1 wherein the radial projection axis of each projection of the plurality of projections intersects the central axis of the plant cover.

3. The plant cover of claim 1 wherein for each rod support of the plurality of rod supports, in the open position, the rod support longitudinal axis extending parallel to the radial projection axis of the respective corresponding projection of the plurality of projections.

4. The plant cover of claim 1 wherein for each rod support of the plurality of rod supports, the latch includes a cantilevered wall, a lower portion of the cantilevered wall coupled to a distal end of body portion, the cantilevered wall extending generally orthogonally to the rod support longitudinal axis, an upper portion of the cantilevered wall includes an angled latch member and for each projection in the plurality of projections, the latch receiver comprising a recess formed in an outer surface of the top wall of the projection, the angled latch member engaging the recess of the projection to releasably secure the rod support in the open position.

5. The plant cover of claim 4 wherein for each rod support of the plurality of rod supports, the latch further includes a release tab extending transversely from the upper portion of the cantilevered wall in a direction away from the angled latch member, the cantilevered wall pivoting about lower portion of the cantilevered wall such that pushing downwardly on the release tab pivots the cantilevered wall such that the angled latch member disengages the latch receiver.

6. The plant cover of claim 1 wherein for each rod support of the plurality of rod supports the body portion is generally cylindrical and, in the closed position, the body portion is in contact with the upper wall and the first and second side walls of the respective corresponding projection of the plurality of projections when the rod support is in the open position.

7. The plant cover of claim 1 wherein the plant cover is in the expanded state when each rod support of the plurality of rod supports is the open position.

8. The plant cover of claim 1 wherein the plant cover is in the collapsed state when each rod support of the plurality of rod supports is the closed position.

9. The plant cover of claim 1 wherein the pivot support of each projection of the plurality of projections comprises an axle extending between the first and second side walls of the projection.

10. A pivoting support assembly for selectively transforming a plant cover extending along a central axis between a collapsed state and an expanded state, the pivoting support assembly operatively coupled to a frame of the plant cover, the pivoting support assembly comprising:
   a) a brace having a central base and a plurality of projections circumferentially spaced apart and extending radially outwardly from the central base, each projection of the plurality of projections extending along a radial projection axis and including an upper wall and first and second spaced apart side walls extending from the upper wall, a proximal end adjacent the central base and a distal end radially spaced from the proximal end, the upper wall and the first and second side walls defining a longitudinally extending socket extending along the radial projection axis of the projection, and a latch receiver; and
   b) a plurality of rod supports, each rod support of the plurality of rod supports pivotally coupled to a respective corresponding projection of the plurality of projections of the brace and including a proximal portion and a distal portion spaced apart by a body portion extending longitudinally along a rod support longitudinal axis and including an opening, the distal portion of the rod support including a latch, the rod support pivoting between an open position and a closed position, in the open position, the body portion being received in the socket of the respective corresponding projection and the latch engaging the latch receiver of the respective corresponding projection and, in the closed position, the latch disengaged from the latch receiver of the respective corresponding projection and the body portion extending transverse to the radial projection axis of the respective corresponding projection.

11. The pivoting support assembly of claim 10 wherein the brace includes a central axis and the radial projection axis of each projection of the plurality of projections intersects at the central axis of the brace.

12. The pivoting support assembly of claim 10 wherein for each rod support of the plurality of rod supports, in the open position, the rod support longitudinal axis extending parallel to the radial projection axis of the respective corresponding projection of the plurality of projections.

13. The pivoting support assembly of claim 10 wherein for each rod support of the plurality of rod supports, the latch includes a cantilevered wall, a lower portion of the cantilevered wall coupled to a distal end of body portion, the cantilevered wall extending generally orthogonally to the rod support longitudinal axis, an upper portion of the cantilevered wall includes an angled latch member and for each projection in the plurality of projections, the latch receiver comprising a recess formed in an outer surface of the top wall of the projection, the angled latch member engaging the recess of the projection to releasably secure the rod support in the open position.

14. The pivoting support assembly of claim 13 wherein for each rod support of the plurality of rod supports, the latch further includes a release tab extending transversely from the upper portion of the cantilevered wall in a direction away from the angled latch member, the cantilevered wall pivoting about lower portion of the cantilevered wall such that pushing downwardly on the release tab pivots the cantilevered wall such that the angled latch member disengages the latch receiver.

15. The pivoting support assembly of claim 10 wherein for each rod support of the plurality of rod supports the body portion is generally cylindrical and, in the closed position, the body portion is in contact with the upper wall and the first and second side walls of the respective corresponding projection of the plurality of projections when the rod support is in the open position.

16. The pivoting support assembly of claim 10 wherein each projection of the plurality of projections includes a pivot support defining a pivot axis and the proximal portion of each rod support of the plurality of rod supports includes a collar pivotally mounted to the pivot support of the respective corresponding projection of the plurality of projections.

17. The pivoting support assembly of claim 10 wherein the brace includes a central axis and each pivot support of the plurality of projections defines a pivot axis, each pivot axis being radially spaced from the central axis of the brace.

18. The pivoting support assembly of claim 10 wherein the pivot support of each projection of the plurality of projections comprises an axle extending between the first and second side walls of the projection.

19. A plant cover extending along a central axis and selectively transformable between a collapsed state and an expanded state, the plant cover comprising:
  a) a frame including a plurality of rods, each of the plurality of rods including a first end and a second end, in the expanded state of the plant cover, a second end of each rod of the plurality of rods being a greater radial distance from the central axis of the plant cover than in the collapsed state of the plant cover;
  b) a foldable canopy secured to the plurality of flexible rods; and
  c) a pivoting support assembly operatively coupled to the frame, the pivoting support assembly including:
    i) a brace having a central base and a plurality of projections circumferentially spaced apart and extending radially outwardly from the central base, each projection of the plurality of projections extending along a radial projection axis and including an upper wall and first and second spaced apart side walls extending from the upper wall, a proximal end adjacent the central base and a distal end radially spaced from the proximal end, the upper wall and the first and second side walls defining a longitudinally extending socket extending along the radial projection axis of the projection, and a latch receiver; and
    ii) a plurality of rod supports, each rod support of the plurality of rod supports pivotally coupled to a respective corresponding projection of the plurality of projections of the brace and including a proximal portion and a distal portion spaced apart by a body portion extending longitudinally along a rod support longitudinal axis and including an opening receiving a first end of a respective corresponding flexible rod of the plurality of flexible rods, the distal portion of the rod support including a latch, the rod support pivoting between an open position and a closed position, in the open position, the body portion being received in the socket of the respective corresponding projection and the latch engaging the latch receiver of the respective corresponding projection and, in the closed position, the latch disengaged from the latch receiver of the respective corresponding projection and the body extending transverse to the radial projection axis of the respective corresponding projection.

20. The plant cover of claim 19 wherein the radial projection axis of each projection of the plurality of projections intersects the central axis of the plant cover.

* * * * *